(12) United States Patent
Pedersen et al.

(10) Patent No.: US 9,596,551 B2
(45) Date of Patent: Mar. 14, 2017

(54) HEARING AID DEVICE COMPRISING A SENSOR MEMBER

(71) Applicant: Oticon A/S, Smørum (DK)

(72) Inventors: Michael Syskind Pedersen, Smørum (DK); Kenneth Rueskov Møller, Smørum (DK); Svend Oscar Petersen, Smørum (DK); Niels Stubager Kiemer, Smørum (DK); Jesper Kofoed Nielsen, Smørum (DK); Björn Ohl, Smørum (DK); Marianne Kleist Elmlund, Smørum (DK); Karin Carvalho, Smørum (DK); Henrik Bendsen, Smørum (DK); Regin Kopp Pedersen, Smørum (DK); Christian C. Bürger, Holte (DK); Steen Michael Munk, Smørum (DK); Morten Christophersen, Smørum (DK); Julie Hefting Pedersen, Smørum (DK); Bo Westergård, Smørum (DK); Maria Oxenbøll, Smørum (DK)

(73) Assignee: OTICON A/S, Smørum (DK)

( * ) Notice: Subject to any disclaimer, the term of this patent is extended or adjusted under 35 U.S.C. 154(b) by 136 days.

(21) Appl. No.: 14/620,685

(22) Filed: Feb. 12, 2015

(65) Prior Publication Data

US 2015/0230036 A1 Aug. 13, 2015

(30) Foreign Application Priority Data

Feb. 13, 2014 (EP) .................................. 14155022

(51) Int. Cl.
*H04R 25/00* (2006.01)
*H04R 1/40* (2006.01)
(Continued)

(52) U.S. Cl.
CPC ........... *H04R 25/65* (2013.01); *H04R 1/1041* (2013.01); *H04R 1/406* (2013.01); *H04R 25/407* (2013.01);
(Continued)

(58) Field of Classification Search
CPC ...... H04R 1/406; H04R 25/00; H04R 25/407; H04R 25/43; H04R 25/55; H04R 25/552;
(Continued)

(56) References Cited

U.S. PATENT DOCUMENTS 6,330,339 B1  12/2001  Ishige et al.
8,515,110 B2 *  8/2013  Neumeyer ............. H04R 25/65
                                                    381/312
(Continued)

FOREIGN PATENT DOCUMENTS

EP           1 530 402 B1    7/2009
WO        WO 98/54928 A2   12/1998
WO        WO 2009/049646 A1  4/2009

*Primary Examiner* — Huyen D Le
(74) *Attorney, Agent, or Firm* — Birch, Stewart, Kolasch & Birch, LLP

(57) ABSTRACT

A hearing aid device is disclosed. The hearing aid device comprises means to improve, augment and/or protect the hearing capability of a user by receiving acoustic signals from the surroundings of the user, generating corresponding audio signals, possibly modifying the audio signals and providing the possibly modified audio signals as audible signals to at least one of the user's ears. The hearing aid device comprises a sensor member for detecting the movement and/or acceleration and/or orientation (or spatial position) of the hearing aid device. The hearing aid device comprises at least two hearing aid microphones and a control unit for determining the position or a deviation from an intended position of the hearing aid device or hearing aid microphones. The hearing aid device is configured to com-
(Continued)

pensate for a possible dislocation of the hearing aid microphones.

20 Claims, 14 Drawing Sheets

(51) Int. Cl.
*H04R 1/10* (2006.01)
*G01C 9/00* (2006.01)
(52) U.S. Cl.
CPC ............. *H04R 25/505* (2013.01); *G01C 9/00* (2013.01); *H04R 2225/41* (2013.01); *H04R 2225/55* (2013.01); *H04R 2225/63* (2013.01); *H04R 2430/20* (2013.01)
(58) Field of Classification Search
CPC .. H04R 25/554; H04R 25/65; H04R 2225/41; H04R 2225/43; H04R 2225/55; H04R 2225/63; H04R 2410/01; H04R 2430/20
USPC ........ 381/23.1, 67, 312, 313, 314, 315, 320, 381/321, 323, 330, 91, 92
See application file for complete search history.

(56) References Cited

U.S. PATENT DOCUMENTS

| | | | |
|---|---|---|---|
| 8,811,637 B2* | 8/2014 | Burns .................... | H04R 25/50 381/312 |
| 8,971,554 B2* | 3/2015 | van Halteren ......... | H04R 25/30 381/312 |
| 2005/0094834 A1 | 5/2005 | Chalupper | |
| 2013/0223660 A1 | 8/2013 | Olafsson et al. | |
| 2013/0343584 A1 | 12/2013 | Bennett et al. | |

* cited by examiner

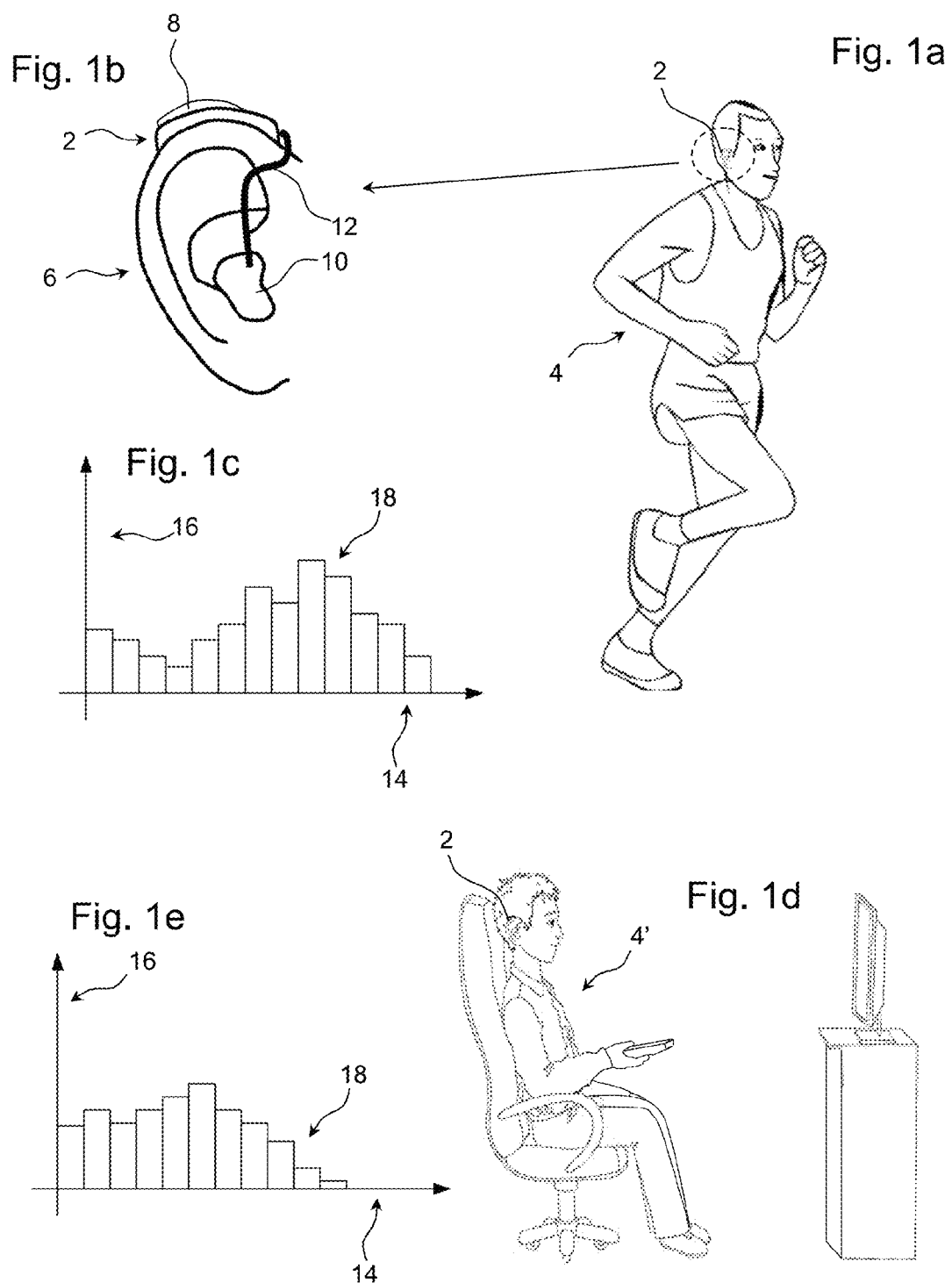

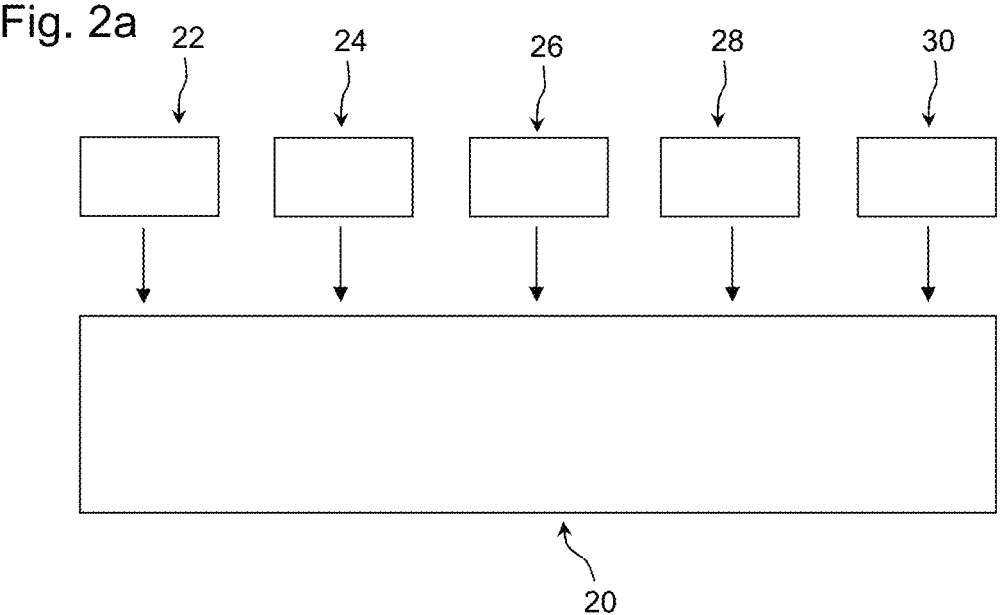
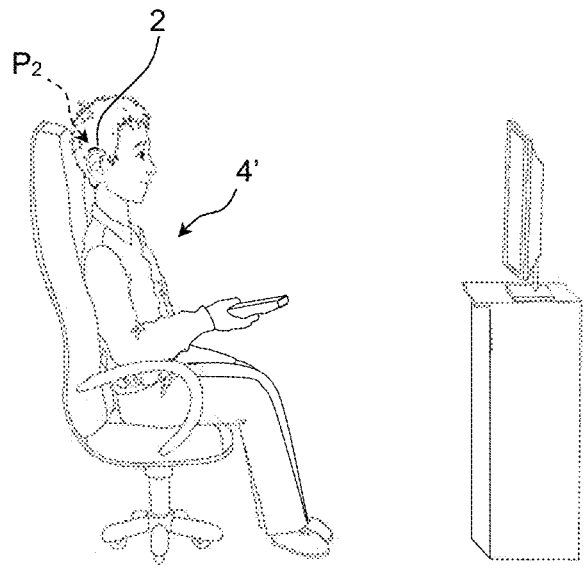

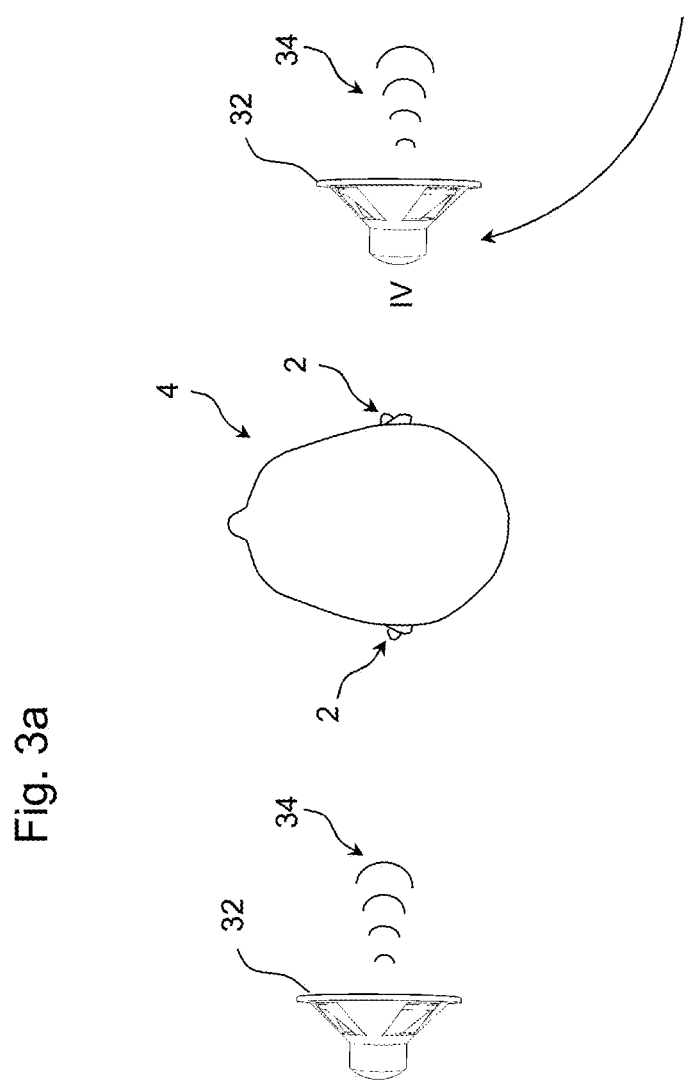

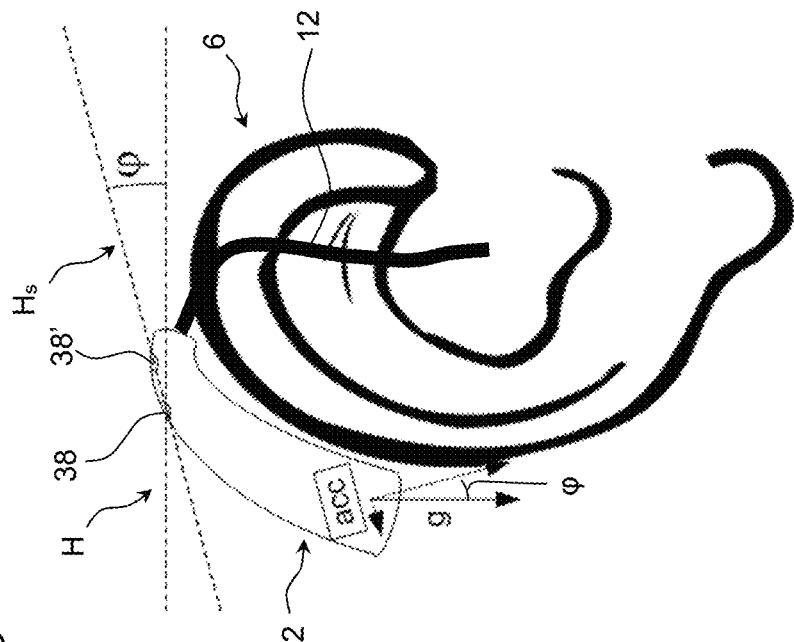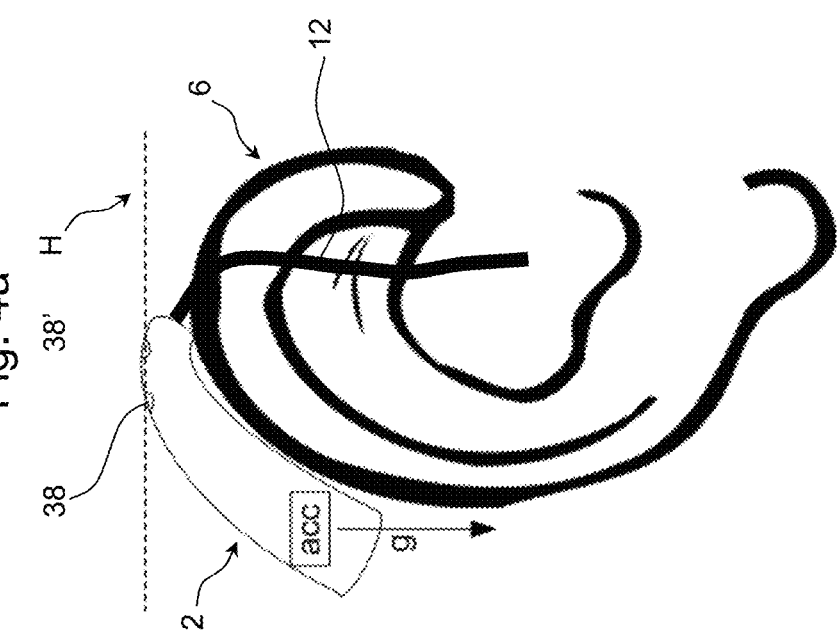

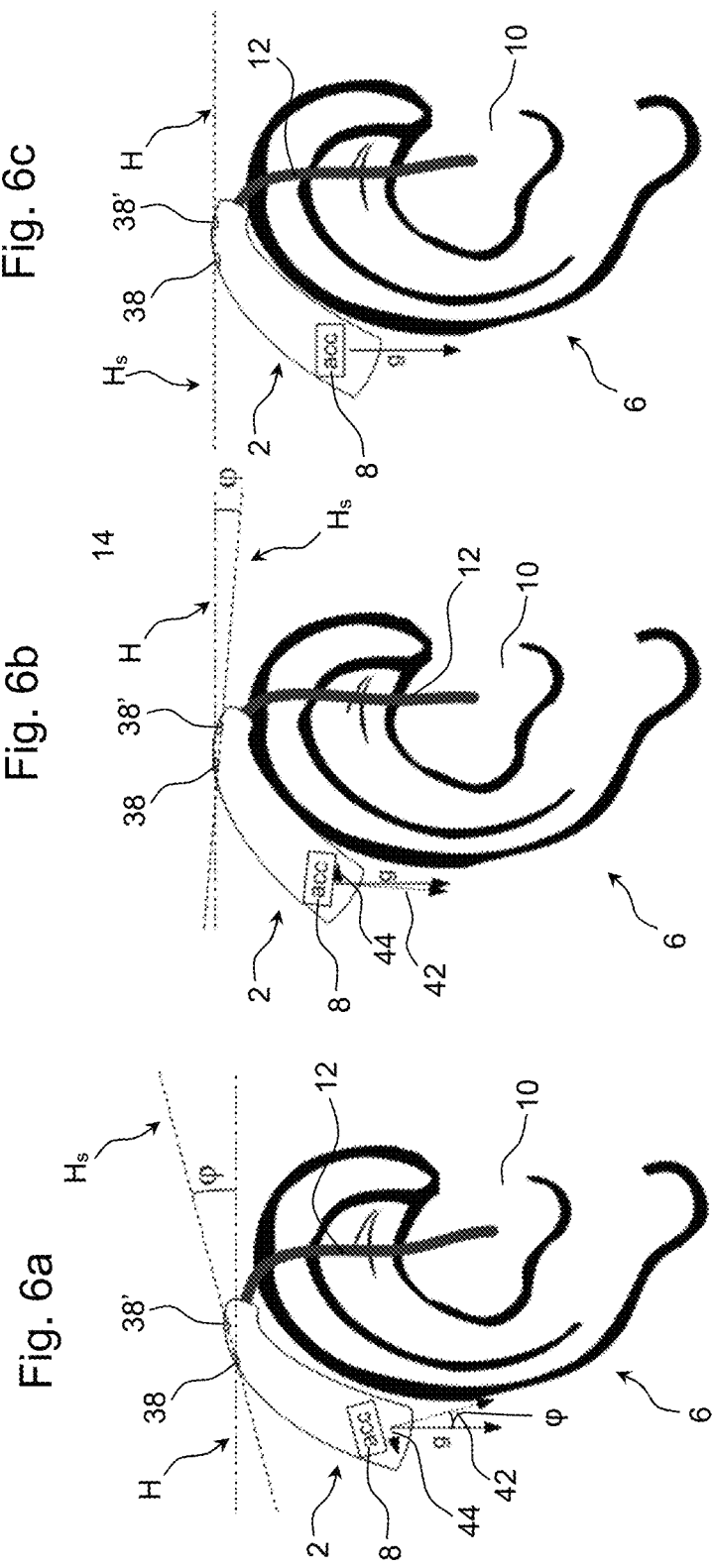

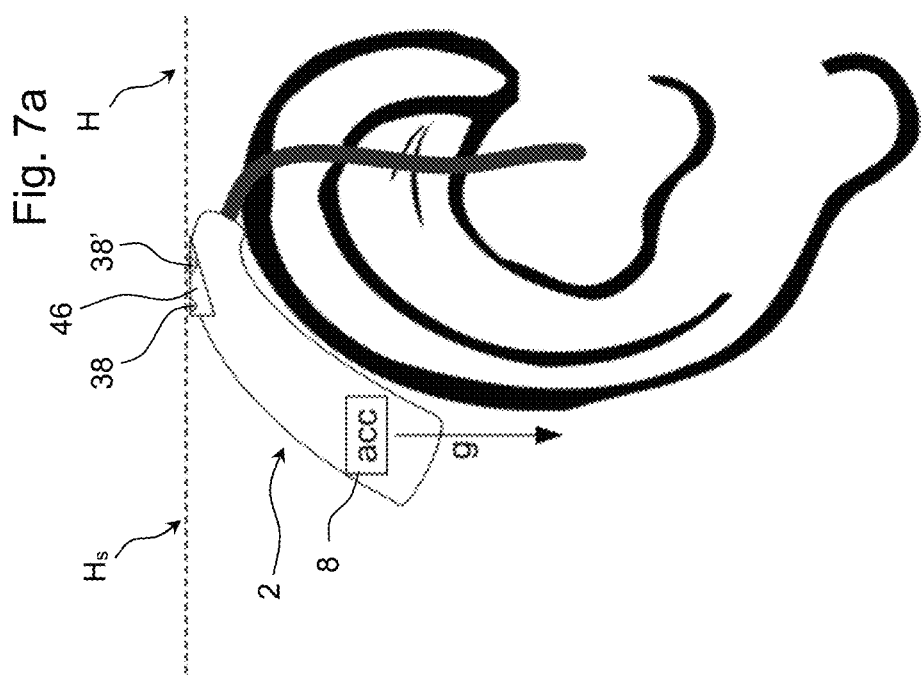
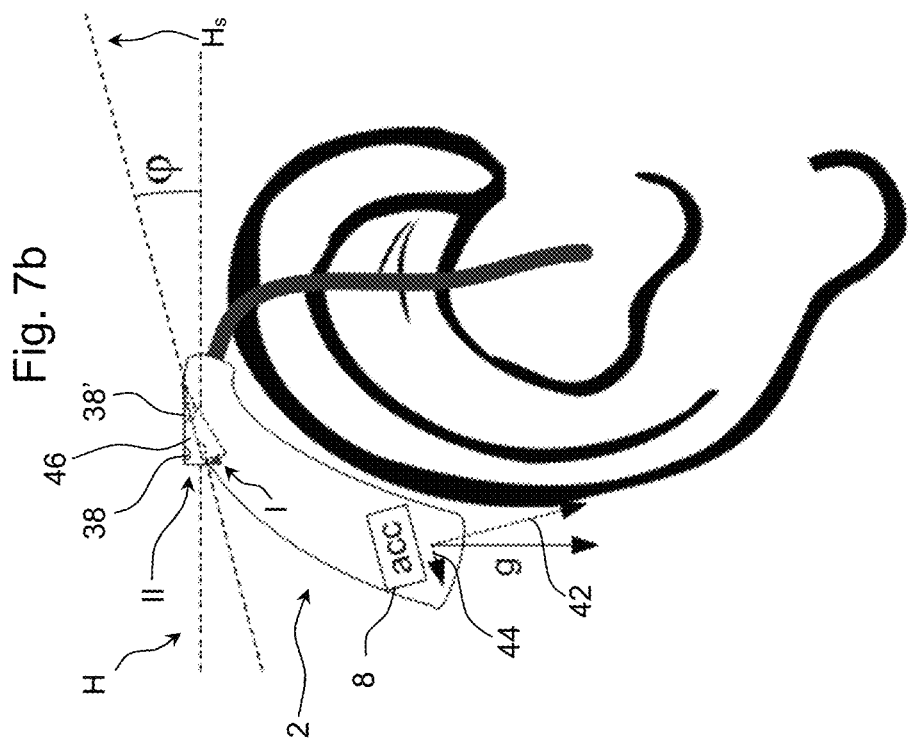

HEARING AID DEVICE COMPRISING A SENSOR MEMBER

FIELD OF INVENTION

The present disclosure generally relates to a hearing aid device comprising a sensor member. The disclosure more particularly relates to a hearing aid device comprising a sensor member for detecting the movement and/or acceleration and/or orientation (or spatial position) of the hearing aid device. The disclosure also relates to a hearing aid system comprising a) two hearing aid devices and/or b) at least one hearing aid device and an auxiliary device the hearing aid device(s) comprising a sensor member for detecting the movement and/or acceleration and/or orientation (or spatial position) of the hearing aid device.

PRIOR ART

In the field of hearing aid devices there is an increasing awareness towards individual adaptation of the hearing aid settings in order to provide wearers with an optimum sound experience. All hearing aid producers aim for providing hearing aid devices that are capable of learning the wearer's individual preferences so that the hearing aid devices can deliver a just-right sound amplification.

Such optimization may be carried out by fitting the hearing aid device on the basis of a number of individual parameters, however, some parameters are difficult to access and quantify. Parameters such as the level of physical activity and the head movement of the user of the hearing aid device may be of great importance.

Movement sensors and compasses are increasingly built into portable electronic devices, e.g. mobile telephones, tablet computers, cameras, etc., e.g. to adapt a screen image to a current orientation of the device in question. Several uses of such sensors in hearing aid devices have likewise been proposed.

U.S. Pat. No. 6,330,339 describes e.g. a hearing aid wherein outputs of a pulse sensor, a brain wave sensor, a conductivity sensor and an acceleration sensor are input to respectively corresponding condition detecting means, and the condition of the wearer (biological information, motion) is detected by the condition detecting means. EP1530402B1 describes e.g. a hearing aid having a plurality of microphones for recording input signals and a computing device for calculating at least one direction from which a predefined acoustic signal comes in, on the basis of the input signals and a position determining device for determining the current position of the head of the hearing aid wearer, so that with the aid of the position of the head the direction to be calculated in the calculating unit can be influenced.

SUMMARY OF THE INVENTION

Thus, it would be advantageous to be able to continuously and automatically have access to information about the level of physical activity of the user of the hearing aid device. Accordingly, it is an object of the present disclosure to provide a hearing aid device that is able to continuously and automatically provide information about the level of physical activity and the head movement of the user of the hearing aid device.

It would also be an advantage to have information about the orientation of the hearing aid device (e.g. relative to another device or to a reference direction), since such information may be used to optimise a noise reduction (e.g. including a directional) system of a hearing aid device. Therefore, it is an object of the present disclosure to provide a hearing aid device that is able to automatically provide information about the orientation of the hearing aid device.

Is an object of the present disclosure to provide a hearing aid device that is able to detect if the hearing aid user is moving or turning his head.

Is an object of the present disclosure to provide a hearing aid device that is capable of preventing the hearing aid from being lost.

It is also an object of the present disclosure to provide a hearing aid system capable of determining the orientation of a pair of hearing aid devices relative to each other.

A lot of applications can be envisioned, if a movement sensor (e.g. an acceleration sensor and/or a gyroscope) and/or a compass is built into a hearing aid device. It may e.g. be controlled by head movements, e.g. a nod or rotation of the head to a side, or a combination thereof. Such sensors can e.g. be used to control details of a directionality algorithm, to provide that a 'look direction' of a microphone system follows the head movement. This and other applications the use of such sensors in hearing aid devices are topics of the present application.

Objects of the present disclosure can be achieved by a hearing aid device as defined in claim 1 and by a hearing aid system as defined in claim 17. Preferred embodiments are defined in the dependent sub claims and explained in the following description and illustrated in the accompanying drawings.

The hearing aid device according to the disclosure is a hearing aid device comprising means to improve, augment and/or protect the hearing capability of a user by receiving acoustic signals from the surroundings of the user, generating corresponding audio signals, possibly modifying the audio signals and providing the possibly modified audio signals as audible signals to at least one of the user's ears. The hearing aid device comprises a sensor member for detecting the movement and/or acceleration of the hearing aid device.

This information can be used to continuously and automatically provide information about the level of physical activity of the user of the hearing aid device. The hearing aid device can also provide information about the orientation of the hearing aid device and detect if the hearing aid user is moving or turning his head.

The sensor may be any suitable type of sensor capable of detecting movement and/or acceleration and/or orientation and/or position of the hearing aid device.

The sensor may be an integrated part of the hearing aid device or be attached to the hearing aid device in any suitable way.

The term "movement and/or acceleration" includes both linear and angular position, velocity and acceleration. Thus, "movement and/or acceleration" may include position, orientation as well as the first and second derivative (e.g. with respect to time) of these. The term "orientation" may e.g. indicate a direction in a stationary coordinate system relative to the earth, or relative to a reference direction, e.g. a direction of the force of gravity, on a particular location on (the surface of) the earth. A "position" of a device may e.g. indicate a set of coordinates in a stationary coordinate system relative to the earth, e.g. the surface of the earth (e.g. GPS-coordinates). These quantities may be expressed in any coordinate system and by means of any unit e.g. the International System of Units (SI).

In the present context, a "hearing aid device" refers to a device, such as e.g. a hearing aid, a listening device or an active ear-protection device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears.

A "hearing aid device" may further refer to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve and/or to the auditory cortex of the user.

A hearing aid device may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing aid device may comprise a single unit or several units communicating electronically with each other.

More generally, a hearing aid device comprises an input transducer for receiving an acoustic signal from a user's surroundings and providing a corresponding input audio signal and/or a receiver for electronically receiving an input audio signal, a signal processing circuit for processing the input audio signal and an output means for providing an audible signal to the user in dependence on the processed audio signal.

Some hearing aid devices may comprise multiple input transducers, e.g. for providing direction-dependent audio signal processing. In some hearing aid devices, the receiver may be a wireless receiver. In some hearing aid devices, the receiver may be e.g. an input amplifier for receiving a wired signal. In some hearing aid devices, an amplifier may constitute the signal processing circuit. In some hearing aid devices, the output means may comprise an output transducer, such as e.g. a loudspeaker for providing an air-borne acoustic signal or a vibrator for providing a structure-borne or liquid-borne acoustic signal. In some hearing aid devices, the output means may comprise one or more output electrodes for providing electric signals.

In some hearing aid devices, the vibrator may be adapted to provide a structure-borne acoustic signal transcutaneously or percutaneously to the skull bone. In some hearing aid devices, the vibrator may be implanted in the middle ear and/or in the inner ear. In some hearing aid devices, the vibrator may be adapted to provide a structure-borne acoustic signal to a middle-ear bone and/or to the cochlea. In some hearing aid devices, the vibrator may be adapted to provide a liquid-borne acoustic signal in the cochlear liquid, e.g. through the oval window. In some hearing aid devices, the output electrodes may be implanted in the cochlea or on the inside of the skull bone and may be adapted to provide the electric signals to the hair cells of the cochlea, to one or more hearing nerves and/or to the auditory cortex.

A "hearing system" refers to a system comprising one or two hearing aid devices, and a "binaural hearing system" refers to a system comprising one or two hearing aid devices and being adapted to cooperatively provide audible signals to both of the user's ears. Hearing systems or binaural hearing systems may further comprise "auxiliary devices", which communicate with the hearing aid devices and affect and/or benefit from the function of the hearing aid devices. Auxiliary devices may be e.g. remote controls, remote microphones, audio gateway devices, mobile phones, public-address systems, car audio systems or music players. Hearing aid devices, hearing systems or binaural hearing systems may e.g. be used for compensating for a hearing-impaired person's loss of hearing capability, augmenting or protecting a normal-hearing person's hearing capability and/or conveying electronic audio signals to a person.

In an aspect, a hearing aid device for improving, augmenting and/or protecting the hearing capability of a user when receiving acoustic signals from the surroundings of the user is provided. The hearing aid device comprises an input unit for generating corresponding audio signals, a signal processing unit for modifying the audio signals, and an output unit for providing modified audio signals as audible signals to at least one of the user's ears. The hearing aid device further comprises a sensor member for detecting the movement and/or acceleration an/or orientation and/or position of the hearing aid device. The hearing aid device comprises at least two hearing aid microphones and a control unit for determining the position or a deviation from an intended position of the hearing aid device or the hearing aid microphones. The hearing aid device is configured to compensate for a possible dislocation of the hearing aid microphones.

The hearing aid device may be any type of hearing aid device including a behind-the-ear (BTE) hearing aid, an in-the-ear (ITE) hearing aid, a completely-in-canal (CIC) hearing aid, an in-the-canal (ITC) hearing aid, a receiver-in-the-ear (RITE) hearing aid. In an embodiment, the hearing aid device comprises a BTE part (adapted for being located behind or at an era of a user) operationally connected to a loudspeaker (receiver) and a microphone located in an ear canal of the user.

It may be beneficial that the sensor member is or comprises an accelerometer and/or a gyroscope. In an embodiment, the sensor member is or comprises a compass, e.g. a magnetic compass, e.g. a magnetometer. In an embodiment, the sensor member is or comprises a positioning system (e.g. a receiver of a satellite positioning system, e.g. a GPS receiver). Hereby, it is possible to use robust and reliable standard components to detect the desired data.

The accelerometer may be an accelerometer configured to measure linear acceleration in one, two or three directions, whereas the gyroscope may be a gyroscope configured to measure angular velocity in one, two or three directions. A compass preferably indicates a direction in a horizontal plane at a particular place on the surface of the earth, e.g. in a North, West, South, East framework.

It may be an advantage that the hearing aid device contains both an accelerometer and a gyroscope so that both linear and rotational movement of the head of the user or of the hearing aid can be determined with high precision and accuracy. In an embodiment, the hearing aid device (or a device in communication with the hearing aid device) additionally comprises a positioning system and/or a compass.

Both accelerometers and gyroscopes are as components designed with specific x, y and z axis relative to their housing. Designing the sensors into hearing aids can be done in ways where the axis of orientations of the sensors directly matches the axis of orientations of the hearing aids (e.g. an axis defined by a 'direction of microphones') when they are placed on a person's ears. In this way no conversion of the accelerometer data is needed to achieve correct movement data (i.e. moving forward may e.g. correspond directly to the positive direction of the accelerometers x-axis). Alternatively, a fixed transformation of the data can be carried out by use of fixed spatial rotation of the axis, based on previous calculated placement of the sensors in the user situation relative to a characteristic direction of the hearing aid device (e.g. a direction defined by the housing of the hearing aid device, e.g. a an outer edge of the housing). But to allow user individualization as well as allowing for free orientation of the sensors, it is advantageous to detect the sensors' placement relative to the head of the user by detecting movement data for each hearing aid device and to compare such data between the hearing aid devices. A spatial rotation matrix may be determined from the combined data, and this can be used for spatial transformation of the sensors' axis to the users current head orientation. The transformation should preferably be continuously adapting to the user's head movements.

It may be an advantage that the hearing aid device comprises means for detecting the level of physical activity of the hearing aid user.

Hereby it is possible to provide a more optimal adjustment of the settings of the hearing aid device. It is possible to have a hearing aid device, in which the hearing aid device settings change automatically while the user is wearing and using the hearing aid device. The settings may be controlled on the basis of measurements made by the sensor member. This may be done in combination with simultaneous application of other detectors (sensor members). In this way it is possible to change settings when environment parameters change or when the level of physical activity of the hearing aid user wearing the hearing aid device changes. Thus, the hearing aid device automatically selects the most optimal settings based on the detected level of physical activity of the hearing aid user.

It may be an advantage that the hearing aid device comprises means for logging and storing data representing the level of physical activity of the hearing aid user.

It may be an advantageous that the hearing aid device comprises means for providing communication with an external device (e.g. a mobile phone having means for logging and storing data representing the level of physical activity of the hearing aid user).

It may be beneficial that the hearing aid device comprises means for setting the compression system of the hearing aid device and/or the noise reduction system on the basis of measurements provided by means of the sensor member. Hereby the hearing aid device can provide the wearer of the hearing aid device with an optimum sound experience.

It may be an advantage that the hearing aid device comprises means for setting the speed of the compression system and/or the aggressiveness of the noise reduction system on the basis of information about the level of physical activity of the hearing aid user provided by means of the sensor member. Hereby it is possible to provide a hearing aid device that is capable of learning the wearer's individual preferences and thus is capable of delivering an optimum sound amplification and sound experience.

It may be advantageous that the hearing aid device user wears or otherwise is in contact with means for applying actual measurements of the level of physical activity as well as prior knowledge about the user's individual behaviour (e.g. on the basis of logged data) to optimise the hearing aid device settings on an individual basis.

It may be an advantage that the hearing aid device comprises means for providing a number of predefined settings each corresponding to corresponding levels of physical activity of the hearing aid user measured on a predefined scale.

It may be beneficial that the hearing aid device comprises means for providing predefined settings (such as fast time constants in the compression system or a more "aggressive" setting for the noise reduction) when the hearing aid device detects that the hearing aid user is physically active measured on a predefined scale.

It may be an advantage that the hearing aid device comprises means for providing other (e.g. less "aggressive") settings when the hearing aid device detects that the hearing aid user is physically less active measured on a predefined scale.

It may be beneficial that the hearing aid device comprises means for changing the settings of the hearing aid device over time based on measurements provided by means of the sensor member. Hereby it is achieved that the hearing aid device constantly can provide the most optimal sound experience for the user. The most optimal settings can be applied by constantly changing the settings on the basis of measurements provided by means of the sensor member.

It may be advantageous that the hearing aid device comprises means for changing the settings with a predefined speed over time based on the different input, including the level of physical activity detected by means of the hearing aid device.

It may be an advantage that the hearing aid device comprises an accelerometer and/or a gyroscope that is built-in or integrated into the hearing aid device and that the hearing aid device is configured to be used as part of a fitting tool, where e.g. the activity level of the hearing aid user is combined with measurements of the environment provided by the hearing aid device or by another device (e.g. a mobile phone), e.g. in a situation where this information define preferences of the user of the hearing aid device. This may be done (e.g. automatically) while switching between different hearing aid device programs corresponding to different levels of activity or by changing the settings in a hearing aid device with a remote control or with a mobile phone.

It may be an advantage that the hearing aid device comprises means for repeating a number of predefined measurements by means of the sensor member and that the hearing aid device comprises means for automatically adjust to the user's preferences determined on the basis of the predefined measurements. When such predefined measurements have been carried out in similar environments for a period of time (e.g. few weeks) the hearing aid device settings may be able to automatically adjust to the user's preferences and thus provide an optimum sound experience for the hearing aid user.

It may be beneficial that the hearing aid device comprises means for logging different user preferences in the hearing aid device. Hereby, individual preferences may be further used in the development, where the preferred settings may be logged and used to find optimal settings for other similar users in similar environments.

It may be beneficial that the hearing aid device comprises means for collecting these user preferences in a network (e.g. stored at a server).

It may be beneficial that the hearing aid device comprises means for detecting if the hearing aid user is moving or turning the head, where the hearing aid device comprises means for improving and/or augmenting received acoustic signals from the surroundings of the hearing aid user by compensating for the head movement if it is detected that the hearing aid user is moving or turning the head. Hereby, when a head movement is detected, the spatial perception of an artificial sound or any sound which is not directly picked up by the hearing aid microphones may be improved by compensating for the head movement.

It may be advantageous that the hearing aid device comprises two hearing aid microphones and means for determining the vertical position of the hearing aid microphones (e.g. a control unit) and means for compensating for a possible dislocation of the hearing aid microphones (e.g. a processing unit). Hereby the hearing aid device can provide an optimum sound experience for the hearing aid user due to the fact that the hearing aid device can compensate for a dislocation of the hearing aid microphones (dislocation of the hearing aid microphones occurs when the hearing aid microphones are not arranged in the same horizontal plane).

In the present context, a 'vertical direction' is taken to coincide with a direction of the gravitational force on a body at a given location. Similarly, a 'horizontal plane' is taken to be perpendicular to the vertical direction (and thus to a direction of the gravitational force on a body) at the given location.

It may be an advantage that the means for determining the vertical position of the hearing aid microphones comprises an accelerometer.

Dislocation of the hearing aid microphones can be determined by the accelerometer, and the noise reduction (e.g. including a directional) system of the hearing aid device may hereby be modified in order to compensate for the sub-optimal mounting. Therefore, when mounting a hearing aid device e.g. behind the ear, the positioning could be optimised in order to improve the performance of different algorithms.

It may be beneficial that the hearing aid device comprises means for determining the direction of gravity.

Hereby knowledge about the direction of gravity can be used to determine the optimal way to adjust the hearing aid device in order to e.g. achieve the vertical position of the hearing aid microphones. It would be possible to determine how to adjust the processing in order to compensate for microphone positions that are not optimal.

Since the noise reduction (e.g. including a directional) system of a hearing aid device to a certain extent relies on the assumption that the microphones are located in the horizontal plane, optimal conditions for processing of the noise reduction (e.g. including a directional) system can be achieved when the microphones are located in the horizontal plane (see e.g. FIG. 4).

It may be beneficial that the hearing aid device comprises means for detecting the direction of the hearing aid microphones of a pair of hearing aid device. This means that for both the right and the left hearing aid device the direction of the hearing aid microphones should be determined. In the present context, the 'direction of the microphones' is taken to mean the direction defined by a straight line joining the two microphones (e.g. their geometrical centres).

It may be an advantage that the hearing aid device comprises an actuator configured to change the orientation (inclination) of the hearing aid microphones. Hereby the actuator can bring the hearing aid microphones into an optimal position, and thus the most optimal sound experience can be provided to the hearing aid user.

In an embodiment, the hearing aid device comprises a directional system with an adaptive directional algorithm for providing a combined signal based on signals from the at least two hearing aid microphones.

In an embodiment, the hearing aid device comprises a feedback estimation unit comprising an adaptive feedback algorithm for estimating a feedback path from the output unit to the input unit.

It may be advantageous that the hearing aid device comprises means for detecting movement of the head of the hearing aid user and means for change the adaptation speed in one or more adaptive algorithms applied by the hearing aid device. Hereby the hearing aid device can enhance the sound experience for the hearing aid user. In an embodiment, the control unit is configured for changing the adaptation speed in one or more adaptive algorithms applied to the audio signal by the hearing aid device.

In some situations it may be an advantage to increase speed of an adaptive algorithm in order to rapidly adapt the directivity pattern to new surroundings. This may be the case when the hearing aid user is moving the head. Hereby the user of the hearing aid device is provided with a sound experience that is improved with respect to the directivity. In an embodiment, the change in direction is used to change the directivity pattern according to the change in angle. The advantage is that the directivity pattern can be calculated (or alternatively loaded) solely based on the existing directivity pattern and the detected head movement, hereby applying a best guess for a directivity pattern. Hereby the sound from the expected direction can be cancelled out faster.

In an embodiment, the hearing aid device comprises a memory wherein a reference position or an orientation of the hearing aid device is stored. In an embodiment, the hearing aid device is configured to compare a current position of the hearing aid with the stored reference position and to determine a modified reference feedback path estimate used for determining the current setting of signal processing parameters used in the signal processing unit for modifying the audio signals. In an embodiment, a reference feedback path estimate is stored in the memory. In an embodiment, the hearing aid device is configured to compare a current feedback path estimate with the stored reference feedback path estimate. This may e.g. be used to qualify the modified reference feedback path estimate used for determining the current setting of signal processing parameters.

In an embodiment, the hearing aid device is configured to determine said modified reference feedback path estimate used for determining the current setting of signal processing parameters based on an algorithm or a lookup table with corresponding values of incremental position changes and feedback path and/or processing parameter values.

In an embodiment, the hearing aid device is configured to determine a modified reference feedback path estimate in connection with power up of the hearing device and/or after a mounting of the hearing aid device at or in an ear of the user.

In an embodiment, the hearing aid device is configured to continuously monitor the microphone positions. In an embodiment, the hearing aid device is configured to modify the reference feedback path estimate and/or the setting of signal processing parameters based on the continuously monitor the microphone positions.

In an embodiment, the hearing aid device wherein the setting of signal processing parameters comprises (e.g. frequency dependent) maximum gain values that may be applied to the audio signals to minimize the risk of feedback.

In an embodiment, the hearing aid device is configured to use the difference in input level between the two hearing aid microphones to detect whether the user's own voice is present in the current acoustic signals received by the microphones and to provide an own voice control signal indicative thereof.

In an embodiment, the hearing aid device is configured to estimate a reliability of the own voice control signal based on a comparison of the current position of the hearing aid with the stored reference position.

It may be beneficial that the hearing aid device comprises a free fall detector and means for sending a signal to another device, e.g. another hearing aid device and/or an external (auxiliary) device. Hereby the hearing aid device is capable of preventing that the hearing aid is lost. Moreover, by sending a signal to an external device, the hearing aid device may alert the hearing aid user and provide information that can be used to identify where and when the hearing aid device was lost.

It may be an advantage that the hearing aid device comprises a free fall detector and means for sending a signal to a mobile phone.

It may be beneficial that the hearing aid device comprises means for sending a signal when free fall is detected by means of the free fall detector. Hereby it is possible to log every time a free fall is detected or to alert one or more individuals.

It may be an advantage that the hearing aid device comprises means for determining the location of the hearing aid device.

It may be an advantage that the hearing aid device comprises means for logging the location of the hearing aid device.

It may be an advantage that the hearing aid device comprises means for wirelessly logging the location of the hearing aid device on an external (auxiliary) device e.g. a mobile phone.

In an embodiment, the hearing aid device is configured to use the sensor member (e.g. a free-fall detector) to estimate an impact shock on the hearing device from impingement on a surface after a free fall, and to log such shock data. In a further embodiment, the configuration of the accelerometer is changed, when free fall is detected. In order to maximize the probability of recording the impact the sample rate of the accelerometer should preferably be changed to its maximum sample rate. Also preferably, the sensitivity of the accelerometer is changed in order to record as high accelerations as possible. As an example, when free fall is detected, change sample rate from 30 times per second to 1000 times per second and change resolution from +/−2 g to +/−16 g.

In an embodiment, the hearing aid device is configured use the sensor member to detect if the hearing aid device is being moved and to characterize the movement (e.g. fast/slow, up/down, etc.), and wherein the hearing aid device is configured to automatically turn off power or to be put into a 'low-power' or 'sleep mode' where the power consumption is minimal, when the sensor member detects that the hearing aid device is in a no-movement mode.

In an embodiment, the hearing aid device is configured use the sensor member to detect if the hearing aid device is being moved and to characterize the movement (e.g. fast/slow, up/down, etc.), and wherein the hearing aid device is configured to be automatically turned on in a full power-on mode or in a 'standby mode', when the sensor member detects that the hearing aid device is in a 'movement mode'.

In an embodiment, the hearing aid device is configured to use the sensor member together with other sensors to detect whether or not the hearing aid device is located at or on the ears of a user, such detection being used to influence a change of power mode. Thereby the decision to turn the power fully or partially on or off can be influenced by other parameters (provided by the 'other sensors') than movement and thus be more taken on a more reliable basis.

Another common problem, in particular for elderly people, is related to accentual falls, e.g. in unattended situations, e.g. at home. The reason for the fall can be several, however the problem is the same. If a person is not able to move after the fall has occurred, the person may not be able to call for help. One solution to the problem include a body worn device that the person can operate to call for help. However, in some cases the person who has fallen is not able to operate this device either. Using a hearing aid device with a build-in movement sensor, e.g. an accelerometer, will enable an automatic evaluation whether the person wearing the hearing aid device has fallen. If this is combined with an auxiliary device, e.g. a SmartPhone (in that the hearing aid device is configured to transmit an indication that the person has fallen to the auxiliary device), an automatic alarm can be conveyed to another person. In case the auxiliary device comprises a cellphone, the phone may be configured to automatically call a pre-selected phone number to a helping person. Utilizing the hearing aid devices, it will be possible for the helping person to communicate with the person in need of help.

Objects of the present disclosure can be achieved by a hearing aid system that comprises two hearing aid devices according to one of the claims 1-16.

In an embodiment, each of the two hearing aid devices comprises antenna and transceiver circuitry for establishing a communication link to the other hearing device, and thereby allowing the exchange of information between them.

In an embodiment, at least one of the two hearing aid devices comprises means for determining the angle between the hearing aid devices on the basis of measurements made by means of the sensor member(s) in the two hearing devices.

Hereby, an optimum sound experience can be provided to the hearing aid user by means of both hearing aid devices.

In an embodiment, the hearing aid system configured to provide that an estimated reliability of the own voice control signal is based on a comparison of the current position of the hearing aid device with the stored reference position of the hearing aid device in each of the two hearing aid devices (i.e. the results of the respective comparisons are exchanged between the two hearing aid devices, compared and used to decide on whether the user's voice is currently present or not).

In an embodiment, the hearing aid system further comprises an auxiliary device. In an embodiment, the hearing aid system is configured to allow the hearing aid devices and the auxiliary device to communicate with each other (e.g. via wireless links, e.g. based on radiated fields and/or on near-field communication, e.g. inductive coupling). In an embodiment, the auxiliary device also contains a movement sensor (e.g. an accelerometer), so that (based on the acceleration patterns in the hearing devices and the acceleration pattern in the auxiliary device) it can be determined if the auxiliary device is carried on the body (in which case both devices have the same movement pattern), and controlling the functionality according to that. An auxiliary device lying at a table could e.g., by use of this sensor input in combination with other inputs, automatically be used as an extra microphone.

It may be beneficial that the angle may be determined on the basis of the direction of the acceleration in each hearing aid device.

It may be an advantage that the hearing aid system comprises means for determining the location of the hearing aid device(s).

Hereby the hearing aid system is capable of logging information or sending information about the location of the hearing aid system. This may be an advantage if one of the hearing aid devices is lost or damaged.

It may be an advantage that the hearing aid system comprises means to log the position where the free fall is detected.

Hereby the hearing aid system can be used to track a lost hearing aid device in an easy way, since the position (and optionally the time) at which a free fall is available.

It may be an advantage that the hearing aid system comprises a GPS device that receives Global Positioning System (GPS) signals to determine the location of the hearing aid devices.

It may be an advantage that the hearing aid system comprises a mobile phone that comprises a GPS device capable of receiving Global Positioning System (GPS) signals to determine the location of the hearing aid device and means to log the position at which a free fall is detected. This has the advantage over e.g. a detection based on lost wireless connection, because the position is logged at the exact place where the hearing instrument is dropped, and an audible or visual warning may also be provided earlier. Alternatively, the location could be based on WiFi hotspots or whatever localization tool is available for the auxiliary device.

It may be beneficial that the hearing aid system comprises means for determining the angle between the hearing aid devices on the basis of measurements made by means of the sensor member.

It may be an advantage that the hearing aid devices comprise means for individually mapping overlapping parts of the sound scene surrounding the hearing aid user and that each of the hearing aid devices comprises means for exchanging information about directions and sound characteristics to the other hearing aid device.

This will allow the other hearing aid device to recognise the sound sources when they enter their scope of acoustic view when the hearing aid user is turning the head.

The hearing aid device may comprise means for detecting the hearing aid user's heartbeat. The hearing aid device moreover may comprise means for providing a signal processing based on the heartbeat information provided by the hearing aid device.

In situations in which the heart rate is increased a specific signal processing may be advantageous in order to ensure a good environmental awareness.

If the hearing aid user is performing outdoor sports and or if the hearing aid user faces dangerous situations, where the hearing aid user should not miss surrounding sounds, it may be of great importance to be able to provide an optimum sound experience.

On the other hand, when the end user is relaxed, the signal processing can be adapted to give a smooth sound that supports this relaxed state.

The hearing aid device may comprise means for detecting the heart beat by using a dedicated microphone that is placed next to the sound outlet in the ear canal. This microphone may be connected to the hearing aid device in which the signal processing is carried out.

It may be an advantage that the microphone signal (from the dedicated microphone) is lowpass-filtered, because only very low frequencies (e.g. around or below 50 Hz) are relevant. Hereby, the influence of environmental sound or the sound presented by the hearing instrument at the outlet will also be minimized.

In fact, the environmental sound (direct sound) will be picked up by the "regular" hearing aid microphones. Therefore, it is possible to estimate the properties of the environmental sound picked up by the extra (dedicated) microphone in the ear canal and to suppress it.

Likewise, the regular microphone signal (or a signal derived therefrom, e.g. filtered or combined with another signal) that is played back by the hearing aid device is also known and can possibly be subtracted from the signal picked up by the extra microphone in the ear canal.

When the signal picked up by the extra microphone in the ear canal has been cleaned up from environmental sound and amplified sound from the hearing instrument, it can be used to detect fairly regular low-frequency level modulations in the order of up to 3 Hz.

The robustness of this estimation can be increased in bilateral fittings, because the heart beat is assumed to be absolutely synchronous in the left and right ear canal.

Closed fittings are advantageous, because they block out environmental sound and the closure of the ear canal may help to increase low frequency levels present in the ear canal. When the heart rate changes, the blood flow in the ear canal may also change. Hereby it is likely that the feedback path will also change, and the functionality of the hearing device can be controlled in dependence of such changes.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 1 *a*) shows a view of a hearing aid user 4 during a physical training session;

FIG. 1 *b*) shows a close-up view of the hearing aid device 2 that the hearing aid user shown in FIG. 1 *a*) is wearing;

FIG. 1 *c*) is a histogram showing the physical activity over time of the hearing aid user shown in FIG. 1 *a*) determined by using a hearing aid device according to the disclosure;

FIG. 1 *d*) shows a hearing aid user watching television;

FIG. 1 *e*) is a histogram showing the physical activity of the hearing aid user shown in FIG. 1 *d*);

FIG. 2 *a*) schematically shows a view of the parameters used to define individual hearing aid device settings;

FIG. 2 *b*) shows a hearing aid user during a physical training session;

FIG. 2 *c*) shows the hearing aid user shown in FIG. 2 *b*) relaxing in front of a television;

FIG. 3 *a*) shows a top view of a hearing aid user standing next to a sound source;

FIG. 3 *b*) shows a top view of the hearing aid user shown in FIG. 3 *a*) turning the head;

FIG. 4 *a*) shows a hearing aid device provided with an accelerometer and two microphones arranged in the same horizontal plane;

FIG. 4 *b*) shows a hearing aid device provided with an accelerometer and two microphones that not are arranged in the same horizontal plane;

FIG. 5 *b*) shows another view of the hearing aid user wearing the BTE hearing aid device shown in FIG. 5 *a*);

FIG. 6 a) shows a side view of a hearing aid device arranged behind the ear of a hearing aid user;

FIG. 6 b) shows another side view of a hearing aid device arranged behind the ear of a hearing aid user;

FIG. 6 c) shows a further side view of a hearing aid device arranged behind the ear of a hearing aid user;

FIG. 7 a) shows a hearing aid device provided with an actuator configured to change the orientation of the hearing aid microphones;

FIG. 7 b) shows another view of a hearing aid device provided with an actuator configured to change the orientation of the hearing aid microphones;

FIG. 9 b) shows a schematic top view of the hearing aid user shown in FIG. 9 a) in a situation where he has turned his head clockwise;

FIG. 11 b) illustrates the centripetal force $F_s = mr\omega^2$ in an angular movement.

FIG. 12 b) illustrates a first method of estimation of angular velocity of a head by an accelerometer located in each hearing aid device of a binaural hearing aid system.

FIG. 12 c) illustrates a second method estimation of angular velocity of a head by an accelerometer located in each hearing aid device of a binaural hearing aid system.

FIG. 14 b) illustrates a second embodiment of a hearing aid system (B) for automatic on/off detection.

DETAILED DESCRIPTION OF THE INVENTION

Figure 5B:
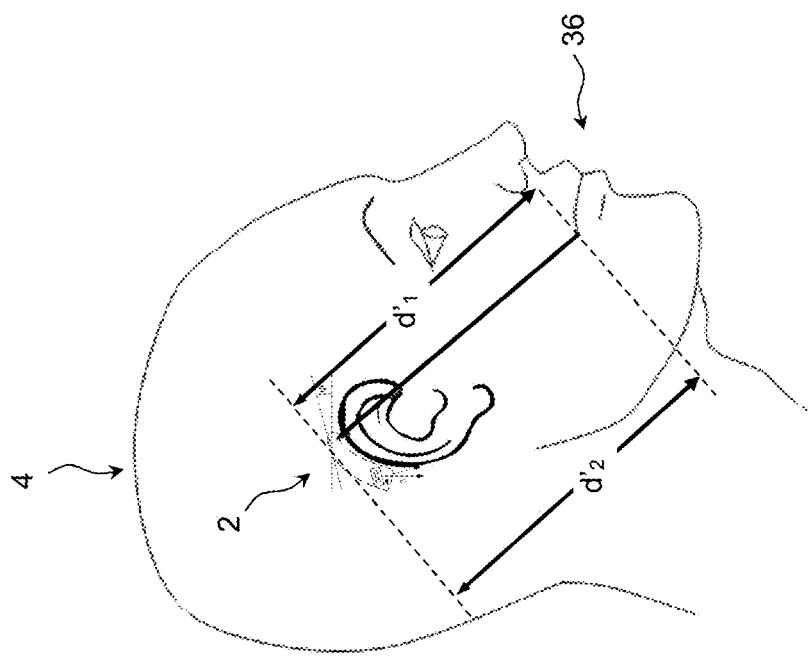
FIG. 5 *a*) shows a view of a hearing aid user wearing a BTE hearing aid device having two microphones that are used to detect the voice of the hearing aid user.

Referring now in detail to the drawings for the purpose of illustrating preferred embodiments of the present disclosure, a close-up view of hearing aid device 2 according to the disclosure is illustrated in FIG. 1 b).

Usage Pattern of a Hearing Aid Device:

The exemplary hearing aid device 2 is a BTE hearing aid device 2 comprising a BTE part adapted for being located at or behind and ear and an ear piece, e.g. an ear mould 10, inserted into the ear 6 (e.g. an ear canal) of a hearing aid user 4 as illustrated in FIG. 1 a). The hearing aid user 4 is performing physical exercise, e.g. running.

In FIG. 1 b) it can be seen that a tube 12 that acoustically connects a loudspeaker of the the casing of the BTE part of the hearing aid device 2 and the ear mould 10. It might alternatively or additionally comprise a cable for electrically connecting electric components in the BTE part of the hearing aid device 2 (e.g. a processor) to an electric component, e.g. a loudspeaker, located in the ear mould 10 (or otherwise positioned in the ear canal of the user, e.g. via an open mould, or a resilient dome).

The hearing aid device 2 comprises a sensor member 8 that is configured to detect motion of the hearing aid device 2 and thus the level of physical activity of the hearing aid user 4. The sensor member 8 comprises an accelerometer or a gyroscope or both. By means of the accelerometer and/or gyroscope the hearing aid device 2 is capable of determining the level of physical activity of the hearing aid user 4. The duration as well as the intensity of activities of the hearing aid user 4 may be determined by means of the sensor member 8 by logging measured data over time. Large linear and angular accelerations and velocities indicate a high level of activity, while low or moderate linear and angular accelerations and velocities indicate a moderate or low level of activity (threshold values between large and medium (and e.g. low) for each parameter being e.g. defined in advance of operation of the hearing aid device).

FIG. 1 c) illustrates a histogram 18 showing the level of physical activity of the hearing aid user 4 (as illustrated in FIG. 1a)) determined by using the hearing aid device 2 shown in FIG. 1 b). The level of physical activity 16 is depicted as function of time 14.

FIG. 1 d) illustrates a view of a less active hearing aid user 4' watching television. The hearing aid user 4' is wearing a hearing aid device 2 according to the disclosure.

FIG. 1 e) illustrates a histogram 18 showing the physical activity 16 of the hearing aid user 4' shown in FIG. 1 d). The physical activity of the hearing aid user 4' is determined by using the hearing aid device 2. The level of physical activity 16 is depicted as function of time 14. When FIG. 1 c) is compared to FIG. 1 e) (e.g. by comparing averaged values of level over a specific time or some other statistical 'distance measure') it can be seen that the level of physical activity 16 generally is lower for hearing aid user 4' compared to hearing aid user 4.

The hearing aid device 2 according to the disclosure may log and store data representing the level of physical activity of the hearing aid users 4, 4'.

The hearing aid device 2 according to the disclosure makes it possible to set the preferred speed of the compression system and the preferred aggressiveness of the noise reduction system individually of hearing aid user 4, 4' based on actual measurements of the level of physical activity 16. Moreover, prior knowledge about the user's individual behaviour (e.g. on the basis of logged data) may be used to optimise the hearing aid device settings for each user on an individual basis.

The hearing aid user 4 who is physically active may prefer a hearing aid device 2 with more aggressive settings (such as faster time constants in the compression system or a more aggressive setting for the noise reduction) compared to the other hearing aid user 4' who is less active during the day. Alternatively, or additionally, the hearing aid settings for a particular user may be (dynamically) varied over time in dependence of the user's current level of activity.

FIG. 2 a) illustrates a schematical view of a number of parameters 22, 24, 26, 28, 30 used to define individual hearing aid device settings 20. These parameters may include the following categories: level of physical activity 22, age 24, cognitive skills 26 (e.g. cognitive (spare) capacity, such as working memory capacity), own voice program 28 and an extra "open" category 30 that may be used for any individually defined category.

Accordingly, by using hearing aid device settings 20 as illustrated in FIG. 2 a), the hearing aid settings depend on several parameters 22, 24, 26, 28, 30 including age 22, cognitive skills 24 or how much the hearing impaired person is talking. Thereby, it is possible to set the hearing aid device settings individually, e.g. determined or influenced by one or more of these parameters in combination with the estimate of the user's current (or average) physical activity.

An accelerometer and/or a gyroscope built-in to the hearing aid device 2 can be used to estimate the physical activity level of the individual hearing aid user 4, 4' during the day. Additionally, the activity level may be estimated by measuring the amount of loudness during the day (e.g. an accumulated sound dose) as well as e.g. the exposure to wind noise, e.g. by logging such parameters over time.

It may (for some tasks) be more advantageous that an accelerometer and/or a gyroscope is built into the hearing aid device 2 compared to a hand held device (such as a mobile phone), because the hearing aid device is attached to the body of the hearing aid user during the whole day. Furthermore, contrary to e.g. a mobile phone, the hearing aids are always positioned in a similar way. Hereby, the accelerometer and/or a gyroscope may provide a more accurate estimate of a hearing aid user's level of physical activity. An accelerometer and/or a gyroscope in a hand-held device may, however; be used in connection with the hearing aid device according to the disclosure in order to estimate the level of physical activity.

FIG. 2 b) illustrates a running hearing aid user 4' during a training session. The hearing aid user 4' is wearing a hearing aid device 2 according to the disclosure. The hearing aid device 2 comprises a sensor member (comprising an accelerometer and/or a gyroscope) that detects that the hearing aid user 4' has a high level of physical activity. Therefore, a predefined preferred set of settings $P_1$ is applied.

FIG. 2 c) illustrates a situation where the hearing aid user 4' has returned from the training session and is relaxing in front of a television. The hearing aid user 4' is wearing the same hearing aid device 2 as in FIG. 2 b). Accordingly, the sensor member detects that the hearing aid user 4' has a low level of physical activity. Therefore, the predefined preferred set of settings is automatically changed from $P_1$ to $P_2$.

The hearing aid device 2 may comprise means for changing the settings $P_1$, $P_2$ (with a predefined speed) over time based on the different input, including the level of physical activity detected by means of the hearing aid device 2. It is possible to have a hearing aid device 2, in which the hearing aid device settings change automatically while the user 4' is wearing the hearing aid device 2 based on measurements from the sensor member. This may be done in combination with simultaneously application of other detectors. In this way it would be possible to change settings when environment parameters change and/or when the level of physical activity of the hearing aid user 4' wearing the hearing aid device 2 changes.

Thus, the settings of the hearing aid device 2 may be optimised for user 4' of the hearing aid device 2. It is possible that the hearing aid device settings slowly adapt over time on the basis of measurements from the accelerometer and/or a gyroscope built-in to the hearing aid device 2. Hereby, these measurements optionally in combination with other detectors may change the hearing aid device settings when environment changes occur or when the activity level of the user 4' changes.

Measurements from the accelerometer and/or a gyroscope built-in to the hearing aid device 2 may be used as part of a fitting tool, where the activity level might be combined with measurements of the environment provided by the hearing aid device 2 or by another device (e.g. a mobile phone) in a situation where this information define preferences of the user 4'. This may be done while switching between different hearing aid device programs corresponding to different levels of activity as shown in FIG. 2 b) and FIG. 2 c) or when changing the settings in a hearing aid device 2 with a remote control (e.g. implemented as an APP in a mobile phone, e.g. a SmartPhone).

When repeated measurements have been carried out in similar environments for a period of time (e.g. a few weeks) the hearing aid device settings may be able to automatically adjust to the user's 4' preferences. Different user's preferences may be logged by the hearing aid device 2 and collected in a network. Hereby, individual preferences may be further used in the development, where the preferred settings may be logged and used to find optimal settings for other similar users in similar environments.

The measurements may be analysed by a professional (hearing aid dispenser) and/or be used by the fitting software, and the hearing aid device settings could be individualised based on this.

The measured activity may also be further labelled, e.g. situations where the user 4' is laying down, running or driving in a car may automatically be detected by the accelerometer and/or a gyroscope built-in to the hearing aid device 2 and be used as specific inputs for the hearing aid settings adjustment.

Spatial Improvement of Sounds without Built-In Localization Cues:

FIG. 3 a) illustrates a schematical top view of a hearing aid user 4 standing next to a loudspeaker 32 sending out sound 34 towards the left ear of the user. A hearing aid device 2 is arranged at or in both ears 2.

FIG. 3 b) illustrates a schematical top view of the hearing aid user 4 shown in FIG. 3 a) turning his head. The head is moved from a first position I to a second position II.

Since an accelerometer and/or a gyroscope is built-in to the hearing aid devices 2 the accelerometers and/or gyroscopes will detect that the hearing aid devices 2 are moved.

Artificial sounds 34 in the hearing aid device(s) 2 such as e.g. internal beeps or streamed stereo sounds may be convolved by head-related impulse responses (HRIR) in order to make the sounds appear as coming from a certain direction (such as appearing to the left of the hearing aid user 4). When the hearing aid user 4 turns his head, the artificial sound 34 will still appear as it is impinging from the left, hereby partly ruining the spatial experience.

The accelerometer and/or a gyroscope built-in to the hearing aid device(s) 2 detect the degree of head movement. This information may be used to adaptively change the head-related impulse response in order to create the illusion that the artificial sound 34 appears to be at the same location IV in the room.

The fastest change of the acoustic surroundings with respect to the hearing instruments is usually when the listener wearing the hearing instrument is moving or turning its head. A hearing aid device 2 with a built-in accelerometer and/or gyroscope is able to estimate such movement of the head of the hearing aid user 4. If such a movement is detected, the spatial perception of an artificial sound 34 or any sound which is not directly picked up by the hearing aid microphones may be improved when compensating for the head movement.

FIG. 3 a) illustrates how a built-in accelerometer and/or gyroscope may be used to improve the spatial perception of an artificial sound 34. An artificial sound 34 (e.g. beep, streamed sound, TV sound signal, telecoil sound or an FM signal comprising a sound signal, e.g. from a microphone) may be convolved by a head-related impulse response in order to create the illusion that the sound 34 is impinging from a certain direction (such as e.g. to the left side of the head indicated with position IV). If, however the hearing aid user 4 is turning his head, the sound will still seem to impinge from the left side, hereby partly ruining the externalization illusion.

Continuous information about the degree of head movement obtained by an accelerometer and/or gyroscope may be used to adapt the head-related impulse response towards another direction. This requires that the hearing aid device(s) 2 have access to a database of head-related impulse responses (or alternatively in the frequency domain head-related transfer functions, HRTF) in samples with a reasonable degree of resolution (e.g. in spatial coordinates, e.g. in azimuthal ($\phi$), and possibly polar ($\theta$), angle(s)) allowing a seamless change in perceived direction.

Optimized Mounting of Hearing Aid Devices:

FIG. 4 a) illustrates a schematical view of a hearing aid device 2 provided with an accelerometer and two microphones 38, 38' that are arranged in the same horizontal plane H indicated by a dotted line.

The hearing aid device 2 is a BTE hearing aid device 2 arranged at or behind the ear 6. The hearing aid device is connected to an earpiece arranged in the ear canal via a tube 12.

If the hearing aid user is running or moving the acceleration acc will be detected by the accelerometer. The noise reduction (e.g. including a directional) system of a hearing aid device often relies on the assumption that the microphones 38, 38' are actually located in the horizontal plane H as shown in FIG. 4 a). Accordingly, optimal conditions for processing of the noise reduction (e.g. including a directional) system can be achieved when the microphones 38, 38' are located in the horizontal plane H. This is, however, not always achieved. The amount of dislocation can be determined by the accelerometer, and the noise reduction (e.g. including a directional) system may hereby be modified in order to compensate for the sub-optimal mounting.

Therefore, when mounting a hearing aid device 2 behind the ear 6, the positioning could be optimised in order to improve the performance of different algorithms.

The accelerometer is able to estimate the direction of the gravity g. Knowledge about the direction of gravity g (relative to a fixed direction of the hearing aid device 2, e.g. the direction of the microphones, $H_s$ in FIG. 4 b), assuming that g is perpendicular to the microphone direction, when the hearing aid device is correctly mounted) can be used to determine how the hearing aid device 2 should be adjusted in order to e.g. achieve a horizontal position of the hearing aid microphones 38, 38' (so that $H_s$=H, $\phi$=0). It would be possible to determine how to adjust the processing in order to compensate for microphone positions that are not optimal. The positions of the microphones can be compensated based on an instant measurement of position, where the person is looking straight forward, but the position could also be determined as an average position based on how the person actually is carrying the hearing instruments. If e.g. the person most of the time is bending the head forward due to back problems, it is better adjusting the hearing instrument angle according to that.

Typically the noise reduction (e.g. including a directional) system assumes that the listener is listening to the sound impinging from the front (look direction), and the noise reduction (e.g. including a directional) system is thus optimized in order to provide a flat frequency response from the front direction. If the hearing aid microphones 38, 38' are not located along the horizontal axis H, the noise reduction (e.g. including a directional) system may be modified in order to provide a flat frequency response of the "new" look direction.

FIG. 4 b) illustrates a hearing aid device 2 provided with an accelerometer and arranged in a position in which the microphones 38, 38' are not arranged in the same horizontal plane H. In this case the accelerometer will determine the direction of gravity g (e.g. relative to H) and the hearing aid device be configured to compensate for the misalignment (with respect to horizontal) of the microphones 38, 38' by modifying the noise reduction (e.g. including a directional) system. This addresses the case, where it is not possible to obtain an optimal (horizontal) microphone configuration. The directional microphone coefficients can be changed to an optimal configuration, which takes into account that the microphone configuration is not optimal.

In an embodiment, the noise reduction system comprises a multi-microphone beamformer (e.g. an MVDR beamformer) and a single channel post filter (as e.g. described in [Kjems & Jensen; 2012] (ISSN 2076-1465: Ulrik Kjems and Jesper Jensen, "Maximum likelihood based noise covariance matrix estimation for multi-microphone speech enhancement", 20th European Signal Processing Conference (EUSIPCO 2012), pp. 295-299, 2012)).

Figure 5A:
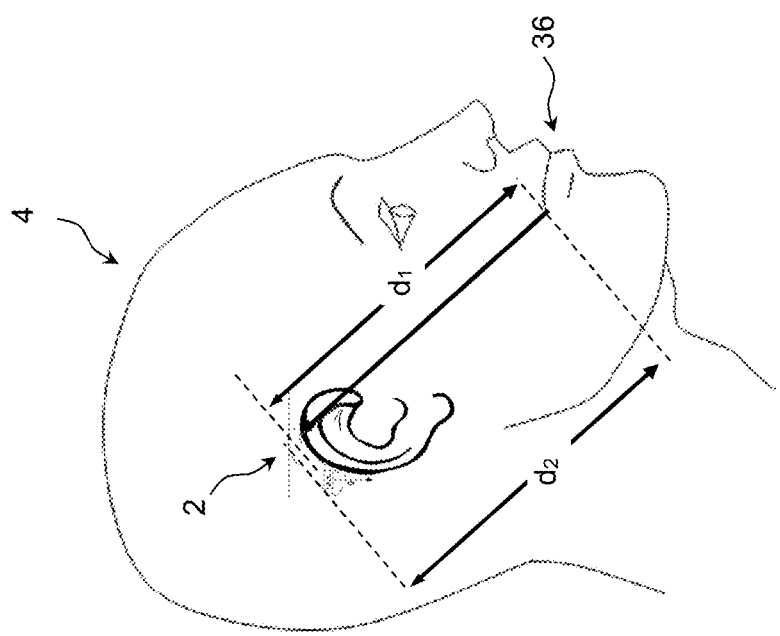

FIG. 5 a) illustrates a view of a hearing aid user 4 wearing a BTE hearing aid device 2 having two microphones that are used to detect the voice of the hearing aid user 4.

Often the detection of the voice of the hearing aid user 4 relies on the fact that one microphone is arranged in a larger distance from the mouth 36 than the other microphone. This is the case in FIG. 5 a) since the distance $d_2$ between the mouth 36 and the furthermost microphone of the hearing aid device 2 is larger than the distance $d_1$ between the mouth 36 and the nearest microphone of the hearing aid device 2. Because the mouth 36 is close to the hearing aid microphones, an intensity difference between the microphones can be detected (acoustic near-field). This difference may be used to detect the voice of the hearing aid user 4.

In FIG. 5 b) the hearing aid device 2 is tilted and thus the microphones are no longer arranged in the same horizontal plane. The mouth direction may be close to perpendicular to the line crossing the hearing aid microphones. This means that the distance $d'_2$ between the mouth 36 and the furthermost microphone of the hearing aid device 2 basically corresponds to the distance $d'_1$ between the mouth 36 and the nearest microphone of the hearing aid device 2. Accordingly, the microphones will have basically the same distance ($d'_1 \sim d'_2$) to the mouth 36, and the near-field cue for own voice detection is not reliable.

Since the hearing aid device 2 comprises an accelerometer, the direction of the hearing aid microphones can be estimated by means of the accelerometer. Accordingly, based on the detected direction of the hearing aid microphones it can be determined whether or not the own voice cue is reliable.

In one embodiment of the disclosure the reliability of the own voice detection may be based on the detected direction of the hearing aid microphones of both hearing aid device 2 (left and right) of a binaural hearing aid system. It may be predefined that only in the case that detection for both ears is accessed and only if the angle of the hearing aid microphones with respect to the mouth 36 results in a reliable cue, the detection should be used (assuming that such information can be exchanged between the two hearing aid devices, e.g. via a wireless link, e.g. an interaural, e.g. inductive wireless link). This could e.g. be measured during fitting (or another calibration routine) because the angle should be measured when the person is looking straight ahead.

FIG. 6 a) illustrates a side view of a hearing aid device 2 arranged behind the ear 6 of a hearing aid user. The hearing aid device 2 comprises a first microphone 38 and a second microphone 38'. The microphones 38, 38' are arranged along a line $H_s$ that is not parallel to horizontal plane or direction H. The angle φ of the hearing aid device 2 is defined as the angle between the line $H_s$ and horizontal H.

The BTE part and the ear piece of the hearing aid device are connected and arranged in the ear canal via a (typically resilient) tube 12. The length of the tube 12 influences the way the BTE part fits behind the ear, and thus also the positioning of the microphones 38, 38'. During fitting of the hearing aid device 2, the optimal length of the tube 12 of the hearing aid device 2 can be determined by measuring the angle φ of the hearing aid device 2 based on measurements provided by means of the accelerometer. This is illustrated in FIG. 6.

In FIG. 6 a), the initial guess of the length of tube 12 is too long and thus the hearing aid device 2 points upwards and the first microphone 38 and the second microphone 38' are not arranged in the same horizontal plane (when the user is standing in an upright position, e.g. on the ground (assuming a vertical direction)). The microphones 38, 38' are arranged along a line $H_s$ that is not parallel to horizontal H. Therefore, the angle φ is non-zero (positive).

The accelerometer of the hearing aid device 2 provides measurements of the acceleration acc having components 42, 44. The accelerometer of the hearing aid device 2 also detects the direction of gravity g. Based on these measurements the angle φ of the hearing aid device 2 (angle of $H_s$ with H) can be established and it can be determined how much the current tube 12 should be adjusted in order to place the hearing aid device 2 in an optimal position.

FIG. 6 b) illustrates another side view of a hearing aid device 2 arranged behind the ear 6 of a hearing aid user. The initial tube 12 guess is too short and thus the hearing aid device 2 points downwards (the angle φ between directions $H_s$ and H has an opposite sign than in the example of FIG. 6 a)). The first microphone 38 and the second microphone 38' are not arranged in the same horizontal plane. The microphones 38, 38' are arranged along a line $H_s$ that is not parallel to horizontal H. Accordingly, the angle φ is non-zero (negative). Based thereon, it can be determined how much the current tube 12 should be adjusted in order to place the hearing aid device 2 in an optimal position.

FIG. 6 c) illustrates another side view of a hearing aid device 2 arranged behind the ear 6 of a hearing aid user. The length of the tube 12 is optimal and thus both the first microphone 38 and the second microphone 38' are arranged in the horizontal plane H. The microphones 38, 38' are arranged along a line $H_s$ that is parallel to horizontal H. Accordingly, the angle φ between $H_s$ and H is zero.

The accelerometer of the hearing aid device 2 detects the direction of gravity g and the angle φ of the hearing aid device 2. It can be verified that the current tube 12 has an optimum length and that no adjustment either of the length of the tube 12 or the position of the hearing aid device 2 is required.

Based on the measured angle φ of the hearing aid device 2 may similarly be applied to determine the optimal cable length of a (resilient, semi-rigid) electric cable connecting a BTE part and a loudspeaker located in the ear canal and electrically driven from (a processor of) the BTE part of the hearing aid device (e.g. a hearing aid device of the 'Receiver In The Ear' (RITE) type).

FIG. 7 a) illustrates a hearing aid device 2 provided with a small actuator 46 configured to change the orientation (inclination) of the hearing aid microphones 38, 38'. The actuator 46 is capable of bringing the hearing aid microphones 38, 38' into an optimal position.

The hearing aid device 2 has a built-in accelerometer 8 adapted to determine the direction of gravity g and the orientation of the hearing aid device 2 relative to the direction of gravity g.

In FIG. 7 a) the hearing aid microphones 38, 38' are arranged along a line $H_s$ that is parallel to horizontal H. Thus, there is no need to adjust the position of the microphones 38, 38' relative to each other.

In FIG. 7 b) though, the position of the hearing aid microphones 38, 38' is changed from a first position I in which the hearing aid microphones 38, 38' are arranged along a line $H_s$ that is not parallel to horizontal H (ANGLE $(H,H_s)=\phi$) into a second position II in which the hearing aid microphones 38, 38' are arranged in the horizontal plane ($H_s$=H). The actuator 46 is indicated with a dotted line in the first position I. The actuator 46 is indicated with a solid line in the second position II.

The actuator 46 brings the hearing aid microphones 38, 38' from the first position I into the second position II and hereby bringing the hearing aid microphones 38, 38' into the desired position. The angular displacement of the line ($H_s$) crossing the hearing aid microphones 38, 38' corresponds to the indicated angle φ.

In the first position I, the hearing aid microphones 38, 38' are arranged along the non-horizontal line $H_s$ and the expected direction of gravity 42 does not correspond to the direction of gravity g. Gravity g indicated as a vector g corresponds to the sum of the components 42 and 44.

When the accelerometer 8 detects the direction of gravity g, these components 42, 44 can be calculated and the required adjustment of the hearing aid microphones 38, 38' can be carried out by means of the actuator 46, as illustrated in FIG. 7 b).

FIG. 7 a) and FIG. 7 b) illustrate a hearing aid device 2 equipped with a small actuator 46 able to adjust the hearing aid microphones 38, 38' into e.g. a position where the hearing aid microphones 38, 38' are positioned in the same horizontal plane H, hereby optimising the effect of the directionality and/or the own voice detection of the hearing aid device 2.

Figure 8:
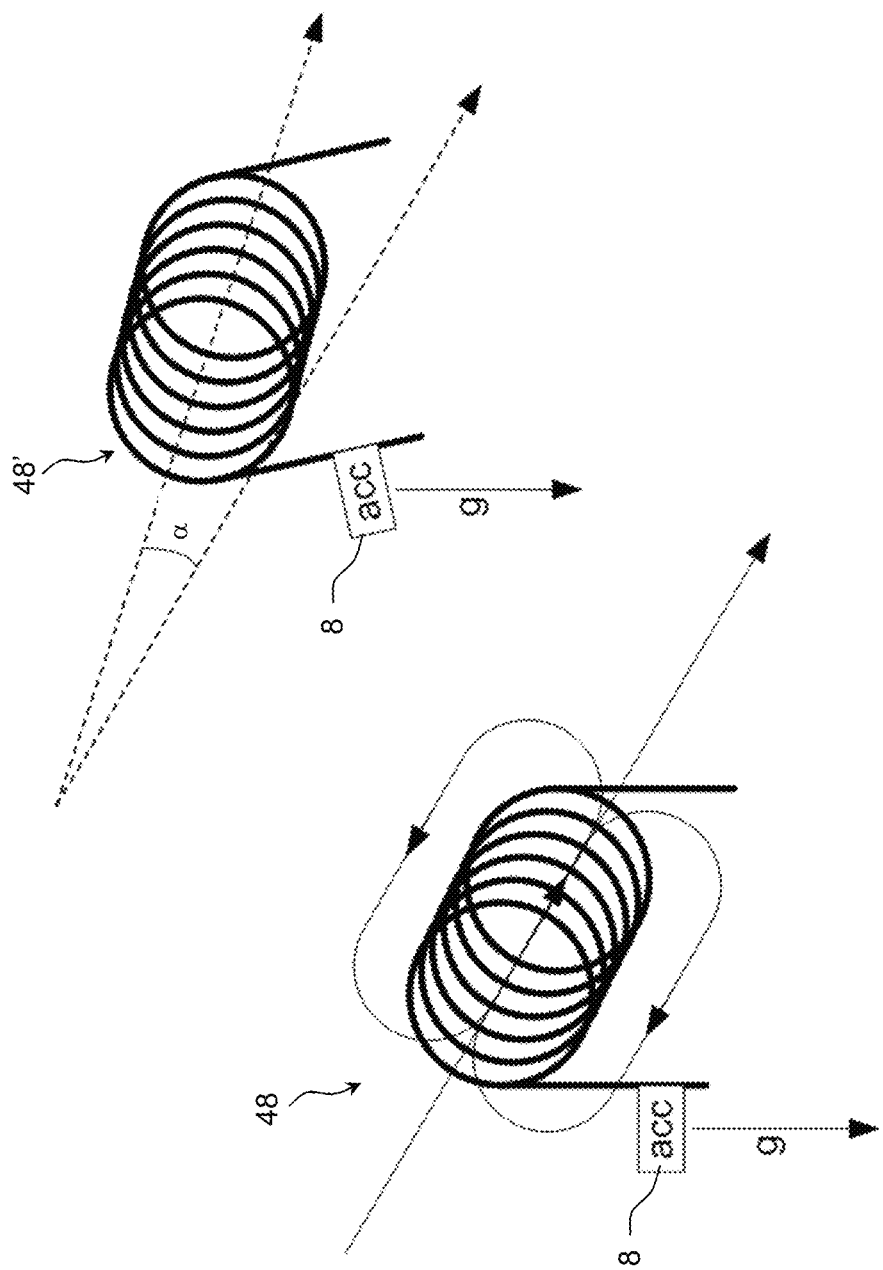
FIG. 8 shows two coils arranged in a hearing system comprising two hearing aid devices, the two coils being arranged in each their respective hearing aid device.

FIG. 8 illustrates two coils 48, 48' arranged in a hearing system comprising two (first and second) hearing aid devices.

The coils 48, 48' may be used to provide communication between the hearing aid devices via magnetic inductance. The distance between the hearing aids may also be determined on the basis of the received signal power (or signal strength; signal strength falls off with $d^3$ (signal power with $d^6$) where d is the distance between the exiting an the exited coils). The received signal strength by a second inductive coil from a first coil depends on the mutual orientations of the two coils. An optimum mutual induction between the two coils can be achieved, if the longitudinal directions of the coils are parallel (as is nearly the case in FIG. 8). If not, the mutual induction is decreased from the optimum. Hence, the distance may be determined more accurately if the angle α between the hearing aid devices (e.g. the coil antennas 48, 48') is determined (based on the transmitted and received signal strength and the angle α). The angle α may be determined on the basis of the direction of the acceleration acc in each hearing aid device.

FIG. 8 illustrates how the angle α between two accelerometers—one in each hearing aid device can be used to improve the calculation of the distance between the two ears based on the strength of the interaural magnetic inductance.

Thus, it is beneficial that if a hearing system comprising two hearing aid devices is equipped with accelerometers capable of determining the acceleration acc in each hearing aid device and to compare the direction of the detected the acceleration vectors acc (acc1, acc2) to the direction of gravity g.

Figure 9A:
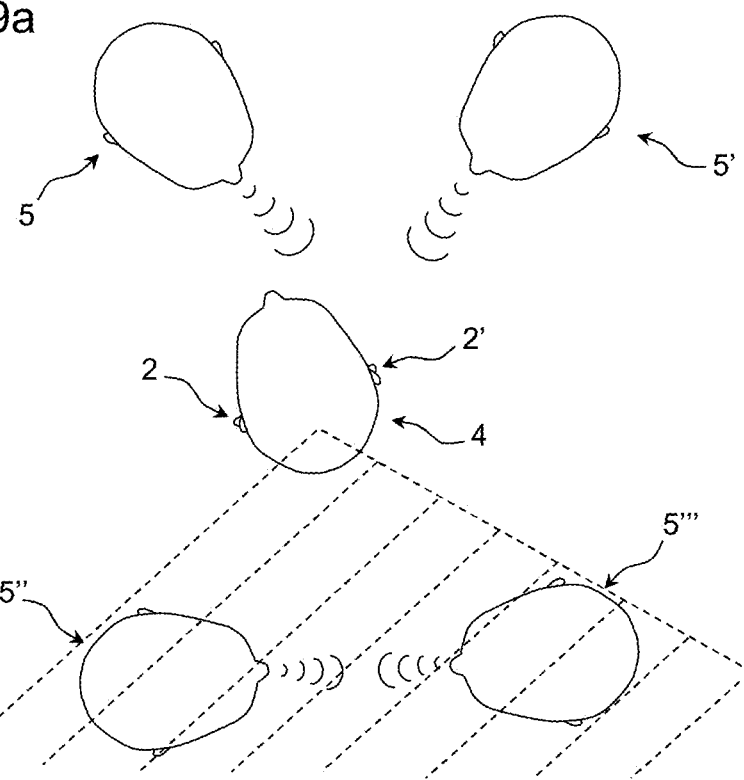
FIG. 9 a) shows a schematic top view of a hearing aid user standing in front of two individuals that are talking to him.
Figure 9B:
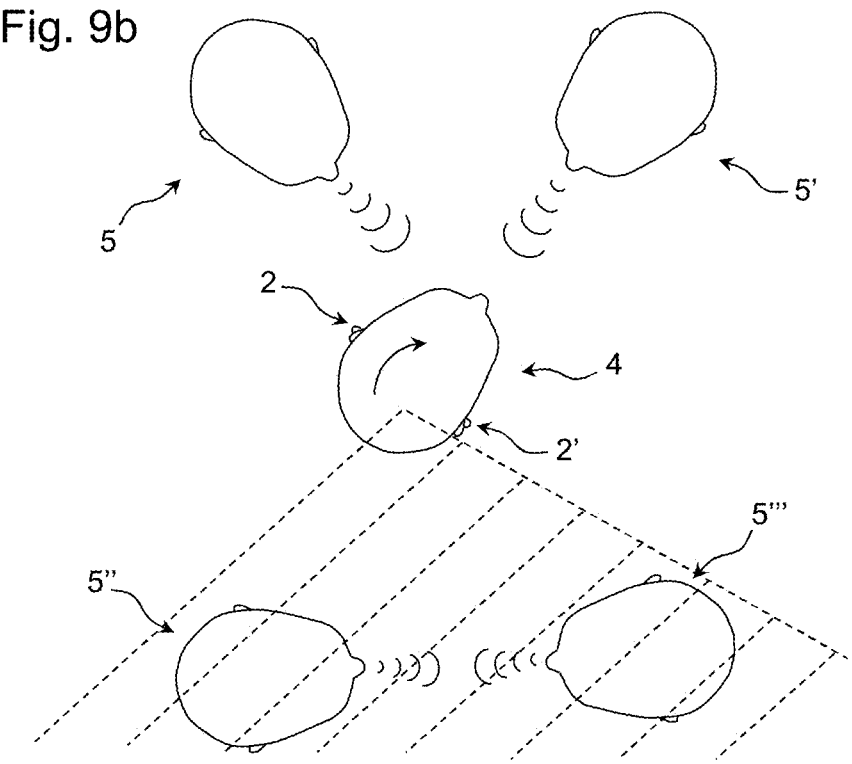

Control of an Adaptive Algorithm:

FIG. 9 a) illustrates a schematical top view of a hearing aid user 4 (wearing hearing aid devices 2, 2' at his left and right ear, respectively) standing in front of two individuals 5, 5' that are talking to him. Two individuals 5'', 5''' are talking to each other in the hatched area behind the hearing aid user 4.

FIG. 9 b) illustrates a schematical top view of the hearing aid user 4 from FIG. 9 a) in a similar situation but where he is turning his head clockwise (cf. curved arrow).

Each of the hearing aid devices 2, 2' comprises an accelerometer and/or a gyroscope that is configured to detect the acceleration of the hearing aids 2, 2' and thus the acceleration of the hearing aid user 4.

FIG. 9 b) shows a situation in which the hearing aid user 4 turns his head. Thus, the acoustic surroundings change. Hereby spatial algorithms in the hearing aid devices 2, 2' (e.g. a noise reduction (e.g. including a directional) algorithm for defining a resulting microphone characteristic, a noise reduction algorithm, or a feedback estimation algorithm) need to re-adapt to the new acoustic setup. The accelerometers and/or gyroscopes in the hearing aid devices are able to detect head movements. Based on the detected acceleration it is possible to adjust the adaptation speed for the adaptive algorithm applied within the hearing aid devices 2, 2'.

The detected acceleration/movement can be used to provide the spatial algorithms with information concerning the change of the acoustic surrounding. Accordingly, the spatial algorithms can increase the adaptation speed for a while in order to provide a fast adaptation to the new acoustic environment.

By means of accelerometers and/or gyroscopes provided in the hearing aids it is possible to detect when it is an advantage to change the adaptation speed in the adaptive algorithm e.g. in order to increase its speed in order to rapidly adapt the directivity pattern to new surroundings.

The directions to be attenuated by the hearing aid are indicated as the non-hatched area.

Feedback Path Variation Due to Placement of Hearing Aid Device(s):

During a fitting process, a standard feedback path is typically measured when the hearing aid device(s) is/are correctly mounted at or in the ear(s) of the user. The feedback path estimate is used as a reference value to set feedback-limits in the hearing aid device(s). However, variations in how the hearing aid device(s) is/are subsequently placed on the ear of the user, affects the feedback path and, thus, feedback performance of the hearing aid device(s).

Knowing the microphone positions relative to the positions during the reference measurement will make it possible to make a correction to the (reference) feedback path estimate (to modify derived gain parameters), and thereby maintain good feedback performance.

The problem is relevant for air conduction as well as bone conduction hearing aid devices. The latter (when bone anchored, e.g. using a partially implanted screw) meet a special challenges, since they can rotate around the screw where they are mounted.

A hearing aid device equipped with a sensor member for detecting the movement and/or acceleration and/or orientation and/or position of the hearing aid device when mounted on or at the user's ear will allow for accessing nay possible variations in the position of the hearing aid microphones relative to the (reference) position they had when the reference feedback path was measured (e.g. the intended mounting position). Preferably, a reference position of or an orientation of a particular hearing aid device (e.g. a direction of a line through the geometrical centers of the at least two hearing aid microphones relative to a direction of the force of gravity) is stored in a memory of the hearing aid device.

When a current position of the hearing aid (in particular the hearing aid microphones) is determined (e.g. in connection with power up of the hearing device, after a mounting of the hearing aid device(s)) a comparison of the stored reference position with the measured current position, allows a modification of the reference feedback path estimate used for determining the current gain settings, e.g. based on an algorithm or a lookup table with corresponding values of incremental position changes and feedback path and/or maximum gain.

In an embodiment, the hearing aid is configured to continuously monitor the microphone positions and when needed to modify current feedback limits (or maximum gain).

Sound Source Mapping:

Both hearing aid devices 2, 2' detect sound from the surroundings of the hearing aid user. When the hearing aid user 4 moves the head, it would be beneficial to have a 360 degree sound scene mapping corresponding to the movement of the head of the hearing aid user 4.

Hearing instruments traditionally use directionality to emphasize sounds from the front and attenuate sounds from the sides and the back. Some systems, however, allow switching of focus to the sides or the back. In reality, the hearing aid user 4 will constantly turn the head to attend to objects of interest and the acoustic focus direction will turn with the head movements causing the focus sound source (e.g. the person 5 speaking) to get out of focus. The result is reduction or fluctuating audibility and intelligibility.

It may be an advantage to have a hearing aid system comprising two hearing aid devices 2, 2' that are configured to work together (supported by wireless interaural communication between them). Hereby it is possible to analyse the sound environment and to detect the directions and properties of individual sound sources 5, 5', 5'', 5''', dynamically. When the hearing aid user 4 turns his head, the hearing aid system detects the movement and adjusts the focus direction(s) accordingly, to maintain audibility and intelligibility of the focus source 5 (or sources 5, 5', 5'', 5''', in case all four sources 5, 5', 5'', 5''' are defined as focus sources).

The focus sources illustrated in FIG. 9 are individuals 5, 5', 5'', 5'''. However, the focus sources may be a sound source (e.g. a person 5 speaking) primarily in front of the hearing aid user 5 (e.g. based on angle detections). The focus sources may be multiple sound sources (e.g. persons 5, 5' speaking) prioritised according to the time the hearing aid user 4 spends focusing the head in the direction of the sound source. The focus sources may be one or more sound sources that the hearing aid user 4 points out manually using a pointer device (not shown, e.g. a remote control device, e.g. implemented as an APP running on a SmartPhone).

When the hearing aid user 4 turns his head carrying the hearing aid devices 2, 2' that determines the rotation as a correlated angle shift of the tracked sound source(s).

The hearing aid devices 2, 2' (alone or in combination with another device, e.g. a remote control, e.g. a SmartPhone, in communication with the hearing aid devices) individually map (overlapping) parts of the sound scene and exchange information about directions and sound characteristics with the other hearing aid devices 2, 2' (and possibly with other connected devices). This will allow the other hearing aid device 2, 2' to recognise the sound sources 5, 5', 5", 5''', when they enter their scope of acoustic view when the hearing aid user 4 is turning his head as illustrated in FIG. 9 b).

The sound scene mapping may be constantly shared between the hearing aid devices 2, 2' and other connected devices. The directionality system in each hearing aid device 2, 2' may be constantly adjusted in order to give higher loudness to the focus sound sources 5, 5', 5", 5'''.

The degree of prioritisation of focus sources may be automatically adapted according to environmental conditions and personal preference settings of the hearing aid user 4.

Free-Fall Indication:

Hearing aid devices 2 are small and expensive. Due to their small size and weight, it may not be noticed if the hearing aid device 2 is dropped and the hearing aid device 2 may not be easy to find.

Accordingly, a hearing aid device 2 that is configured to communicate with a mobile phone (e.g. a SmartPhone) 40 when a hearing aid device 2 is falling is a major advantage. The hearing aid device 2 should comprise an accelerometer and/or gyroscope adapted to detect when the hearing aid device 2 is dropped. One possible criterion to determine that the hearing aid device 2 is dropped may be the detection of an acceleration corresponding to the acceleration of the force of gravity for a predefined time period e.g. a time period corresponding to that the hearing aid device 2 is moved more than 50 cm, e.g. more than 100 cm downwards in the vertical direction (this depends on the initial speed of the hearing aid device 2).

Figure 10A:
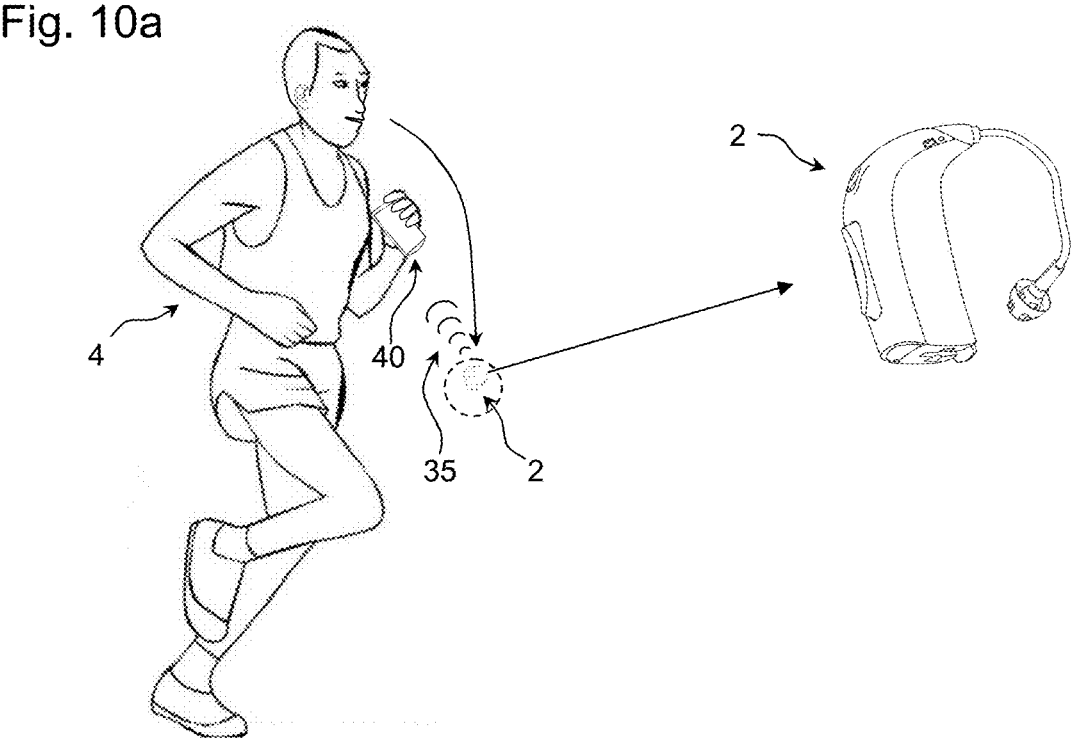
FIG. 10 a) shows a situation where a hearing aid device is dropped by mistake and FIG. 10 b) shows another situation where a hearing aid device is dropped by mistake.
Figure 10B:
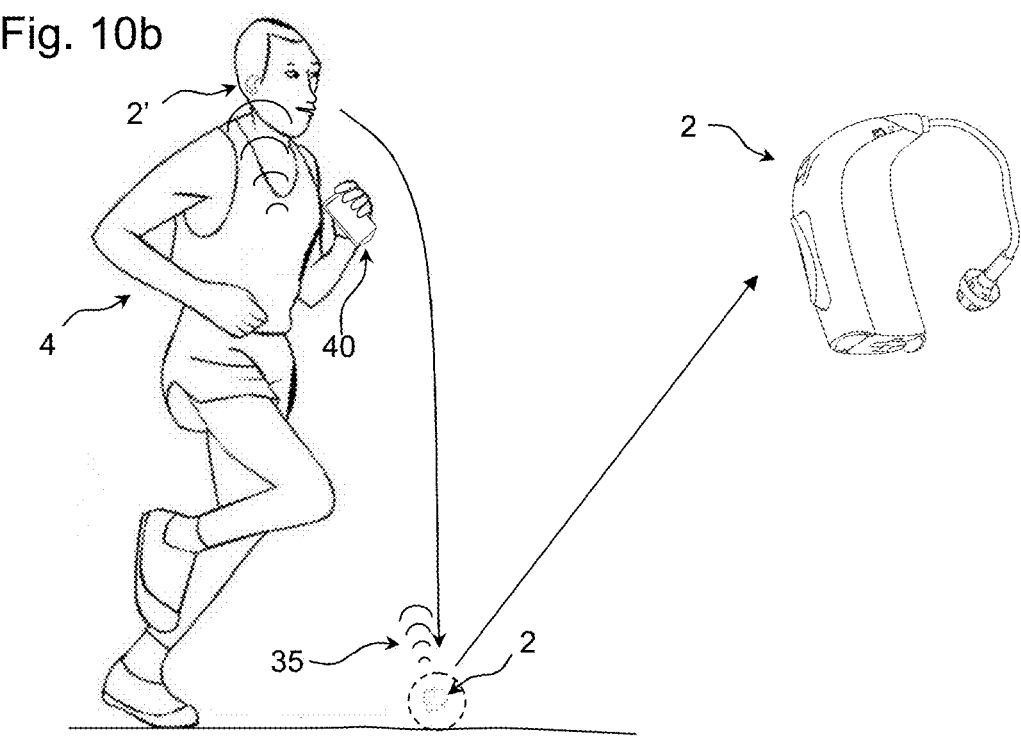

FIG. 10 a) illustrates a situation where a hearing aid device 2 is dropped by mistake by a hearing aid user 4 that is running. The hearing aid device 2 is provided with a free fall detector that sends a signal 35 to a mobile phone 40, e.g. a SmartPhone. The mobile phone 40 comprises a GPS device that receives Global Positioning System (GPS) signals to determine the location of the hearing aid device 2 and means to log the position where the hearing aid device 2 was lost.

Thus, the hearing aid device 2 and the mobile phone 40 constitute an alarm system using a free fall detector that is indicating when and where the hearing aid device 2 is dropped. Many standard mobile phones on the market today have a built-in GPS device and means for storing a position where the GPS device has been used.

FIG. 10 b) illustrates a situation in which a hearing aid device 2 is dropped by a running hearing aid user 4.

The hearing aid device 2 comprises an accelerometer and/or a gyroscope configured to determine the acceleration of the hearing aid device 2. The accelerometer and/or gyroscope constitute a free fall detector that sends a signal 35 to the other hearing aid device 2' of a binaural hearing aid system immediately after the hearing aid device 2 is dropped. This alarm signal is provided in the other hearing aid device 2' so that the hearing aid user 4 is warned by an audio signal. By use of wireless communication between the hearing instruments, the acceleration patterns or the free fall detection could be interchanged. Hereby it can be detected if one or both hearing instruments are dropped. Only if one instrument is dropped, a warning in the opposite hearing instrument is necessary.

Accordingly, the hearing aid user 4 is aware that the hearing aid device 2 has been lost. The alarm signal may also be also be displayed on the mobile phone 40 that the hearing aid user 4 is holding in his left hand or sent to a communication device of a caretaker. This may be beneficial for a caretaker to be noticed on her phone, e.g. if a child has lost a hearing aid device 2.

The hearing aid device 2 may send a signal 35 to the mobile phone 40 that may comprise a GPS device so that the position where the hearing aid device 2 was lost can be logged. Hereby, the mobile phone may assist to localise the spot, at which the hearing aid device 2 was lost. Alternatively, the hearing aid device 2 may comprise means for logging the last position where a wireless link was established between the two hearing aid devices 2, 2' or between the lost hearing aid device 2 and the mobile phone 40.

The hearing aid device 2 according to the disclosure is configured to provide a warning, which may be triggered even before a wireless link is lost, and hereby increasing the probability of noticing when and where the hearing aid was lost. An accelerometer and/or gyroscope built-in to the hearing aid device 2, 2' can be used to estimate if the hearing aid device is dropped (free fall detection).

When the hearing aid device 2 is dropped through the air, a free fall is detected by the accelerometer and/or gyroscope, and the other hearing aid device 2' can be alarmed immediately. Furthermore, if the hearing aid user 4 is wearing a GPS device, e.g. a mobile phone with a built-in GPS device, the position of where the hearing aid device was dropped may be logged in the mobile phone 40, and afterwards be used to assist the hearing aid user 4 in tracking his hearing aid device 2. After a free fall has been detected, and it has been detected that the hearing instrument has had an impact and is lying without further movement, the hearing instrument can go into a low power mode, where the battery power solely is used for transmitting a wireless signal with maximum strength, hereby making it easier to localize the hearing instrument. E.g., the hearing instrument could transmit such a localization signal once every second in order to prolong the battery time and hereby increasing the probability of being found.

In one embodiment according to the present disclosure, the mobile phone 40 is configured to provide an alarm signal that is sent to an external device (e.g. a mobile phone of a caretaker or a server).

Fear of Loosing a Hearing Aid:

It has been indicated that many users of hearing aids have a constant fear of losing it or them. Hearing aids are perceived both as expensive items and, by many users also indispensable, thus the fear of losing them. To address this experienced concern about losing a hearing aid, it is suggested to build in a Drop Alarm feature in hearing aids. The alarm should be triggered by a free fall and/or a hard landing. For example, it is proposed that once the alarm is activated, some or all of the following actions will be performed:

The hearing aid will vibrate.

The hearing aid will start beeping at a (customized) level audible to the individual user.

A visual indicator on the hearing aid will start blinking.

The hearing aid will send a message to the hearing aid in the other ear.

The hearing aid will send a message/e-mail to the user's or other person's smart phone/tablet/computer.

This will make it easy for the user to identify the location of the lost hearing aid. The alarm should e.g. be de-activated by opening and closing the battery drawer, or by any other activation element (e.g. via a user interface).

It has also been revealed that even though currently available instruction material enables both users and non-users to carry out daily tasks related to handling hearing aids, only very few people know when a task is carried out correctly. As an example, if a relative or a care assistant is to replace batteries in a pair of hearing aids, they get no immediate indication of whether this has been done correctly or not. Today, a hearing aid typically plays a short jingle when switched on, but most non-users are unaware of this. Furthermore, some non-users who are aware of the jingle and its function, but are unaware that they need to put the hearing aid close to the ear in order to hear the jingle. Also some users are unaware of the jingle, because they close the battery drawer before they put on the hearing aids. To address this shortcoming, we suggest building in a physical indicator, e.g. in the form of a vibrator that will go off for one second each time the hearing aid is switched on. This will let the person changing the battery know both that the battery is positioned correctly and that the hearing aid is working.

It is proposed to provide the hearing aid with a drop (free fall) detector and alarm unit that can help the user with their concern of losing their device. This system may e.g. come with some or all of the following five different features in order to secure diversity:

A. Tactile feature: The hearing aid should preferably have a vibrating device incorporated which should be used when the user changes battery, to ensure correct installation of battery. It should also be activated if the hearing aid falls/lands hard (e.g. if subject to an abrupt deceleration). When the hearing aid falls or lands hard, the hearing aid will start vibrating. A micro vibration motor (or a similar device) may form part of the hearing aid to provide the tactile feature. When the battery is inserted into the battery drawer and locked, the hearing aid is configured to vibrate indicating that the battery is placed correctly and that the hearing aid is working.

B. Audible feature: The hearing aid should preferably provide different kinds of alarm notes, e.g. 3 different notes. The alarm notes should be added automatically according to the user's needs, e.g. by fitting software during a fitting process according to the user's audiogram. This will ensure that users with hearing loss in the high frequent range will get alarm notes at lower frequencies. The alarm notes could be at different levels (dB) according to the user's audiogram. When the hearing aid falls/lands hard, it is preferably configured to start beeping, and/or to issue one or more notes (notifications), preferably at an audible frequency and dB level for the individual user.

C. Visual feature: The hearing aid should preferably have a visual alarm, i.e. light, e.g. blinking light, when the hearing aid is dropped. This could be featured in a tube of the hearing device (e.g. provided by an optical fiber and an LED) or in that a shell part (e.g. one half of the shell, e.g. the one facing the head, when the hearing aid is mounted at an ear of the user, to make it invisible during normal use) is transparent, and then have a diode/LED incorporated in the hearing aid housing to give light through the transparent shell part.

D. Message feature: The hearing aid should preferably send an alarm tone or message (e.g. "Attention: lost hearing aid") to the hearing aid in or at the other ear, as soon as it discovers that one hearing aid is in free fall (e.g. "Attention: lost hearing aid"). The other hearing aid can then, for example, play a downward sweep and/or vibrate.

E. Smart phone/tablet/computer feature: The hearing aid should preferably send a message (e.g. "Attention: lost left hearing aid", e.g. on a Bluetooth (or Bluetooth Low Energy) or similar, e.g. proprietary, link to another device, e.g. a SmartPhone, e.g. making the device vibrate, and/or send out an alarm tone. In addition the user could choose to have GPS switched on in the hearing aid in order to locate the hearing aid via the other device (e.g. a SmartPhone). This should only be provided if the user has given consent to this, because it otherwise could give the user an unpleasant feeling of being under surveillance. The smart phone would then be able to give information of the location of the hearing aid, both visually (on a map) and verbally (by a voice in the phone). The alarm should preferably be set in an off state when exposed to a free fall or by a hard landing. The fall may preferably be measured by an accelerometer.

All together the Drop Alarm will reduce the users' fear of losing their hearing aids, because if they lose them the Drop Alarm will immediately attract the user's attention, so that he/she can find his/her lost hearing aid(s).

Shock Surveillance:

The above deals with detecting when and where a hearing aid device is exposed to a fall. The following deals with the 'impact' situation when the hearing aid device hits the ground after a free fall. In general, not much information on the properties of such impact shocks on hearing aids are available. Most design and validation of hearing aid devices are based on a number of 'rules of thumb' and empirical data. If a large number of data on real usage were available (e.g. in a database), the design could be optimized with the potential of saving development and test time as well as pushing the design closer to the limits. Logging of data would also allow for self-test in hearing aid devices; if e.g. they have been subjected to a predefined number of shocks they can call for service (e.g. by issuing a beep or a voice message). After a shock has been detected, it is likely that the microphone characteristics have changed. Hereby the performance of the noise reduction (e.g. including a directional) system will deteriorate. Thus an automatic microphone matching routine should preferably be run after such a shock has been detected. This could be done e.g. by increasing the adaptation time of the automatic microphone matching system, or it could be done during a calibration of the hearing aid device.

Some or all of the following data could preferably be detected and logged in a database. The determination of the parameters is based on the possibility of measuring acceleration in the hearing aid device(s).

Logging the Shock Data:

Detect all impacts (levels, time and numbers) to the hearing aid for design improvements.

Detect exact impact direction in order to get knowledge for design improvements.

Detect all impacts (levels, time and numbers) to the hearing aid for improved reliability data.

Detect all impacts (levels, time and numbers) to the hearing aid for improved usage knowledge.

Log impact sequence to analyse displacements of receiver/suspension to improve design.

Detect all free falls (fall time, aids direction on impact and numbers) to the hearing aid for design and reliability improvements.

Estimating Shock Level:

2.a As the shock levels can be very high, it can be too high for the accelerometer to measure. Also the impact will have a very short duration of time (hence, when a free fall is being detected, the sample rate and the measurement range of the accelerometer should preferably be maximized in order to increase the probability of recording the impact). Instead, the accelerometer could estimate the drop height by measuring free fall time and from that estimate the shock level (further the accelerometer data could possible identify the surface hardness for use in the estimation).

Reacting to Free Fall or Shock:

Detect exact impact direction in order to protect the receiver by displacement of armature in the opposite direction.

The IC should be re-booted to avoid that the IC ends up in an undefined electric state (e.g. due to the creation of glitches due to the impact, e.g. due to battery contacts being temporarily disconnected).

The feedback path should be estimated again to verify that the gain margins are still OK.

A possible adjustable vent should be set to a default state to be sure of its position.

Best buddy: An alarm warning that something has happened should be issued (e.g. by the other hearing aid device).

Howl, blink, warning should be generated by the hearing aid device dropped for easy location detection.

Using an Accelerometer for Live Functionality Surveillance:

An accelerometer can be used to measure vibrations from a receiver (loudspeaker) to detect changes in vibration pattern caused by faults in the receiver or other components.

Head Movement:

Four examples are given in the following to introduce a typical setup and relevant parameters and problems involved in measuring movement data of a hearing aid device or a pair of hearing aid devices located at an ear or at both ears, respectively, of a user.

Example 1

How to Measure Pitch, Yaw and Roll Using a Movement Sensor

Pitch, yaw and roll represent angles of rotation around respective orthogonal axes of a center of mass of an aircraft. In the following, these terms are used for a head of a user of a hearing aid device or a binaural hearing aid system comprising left and right hearing aid devices adapted for being located at or in left and right ears of a user respectively.

Figure 11A:
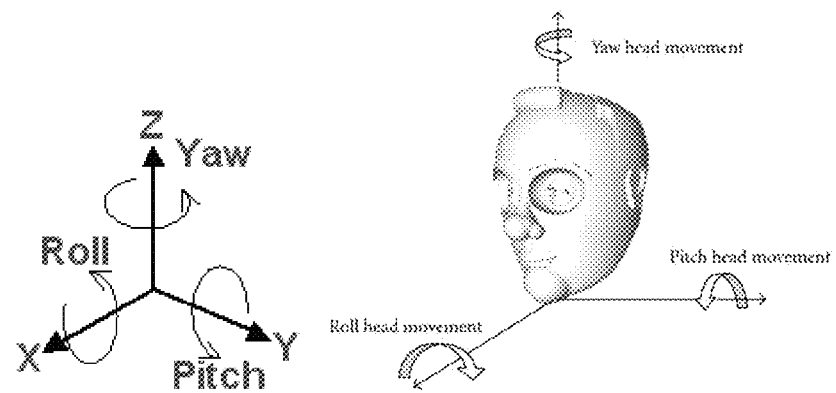
FIG. 11 a) illustrates a definition of the rotational movement parameters pitch, yaw and roll relative to the x, y and z axis of an orthogonal coordinate system (left) and relative to a head of a user (right).

A definition of the rotational movement parameters pitch, yaw and roll relative to the x, y and z axis of an orthogonal coordinate system is illustrated in the left graph of FIG. 11a. Roll is defined as a rotation around the x-axis. Pitch is defined as a rotation around the y-axis. Yaw is defined as a rotation around the z-axis. The corresponding parameters are exemplified relative to a head of a user in the right graph of FIG. 11a.

Pitch is defined as a rotation of the head around the x-axis. Can be measured by either a single or a pair of hearing aid devices. A gyroscope in a hearing aid device can measure it directly. Measurements from a pair of gyroscopes in each their hearing aid device can be averaged to provide higher precision. An accelerometer will measure the direction of the gravity field and the pitch can then be determined by calculation of the difference between the actual directions of the gravity and a previous determined 'normal' direction i.e. the established z-axis. If two hearing aids both estimate pitch, they can combine their results for better precision.

Yaw is defined as a rotation of the head around the y-axis. Can be measured by either a single or a pair of hearing aid devices. A gyroscope in a hearing aid device can measure it directly. Measurements from a pair of gyroscopes, one in each hearing aid device can be compared (e.g. averaged) to provide higher precision. With an accelerometer there are two ways to estimate yaw or more exact angular velocity $\omega$.

Figure 11B:
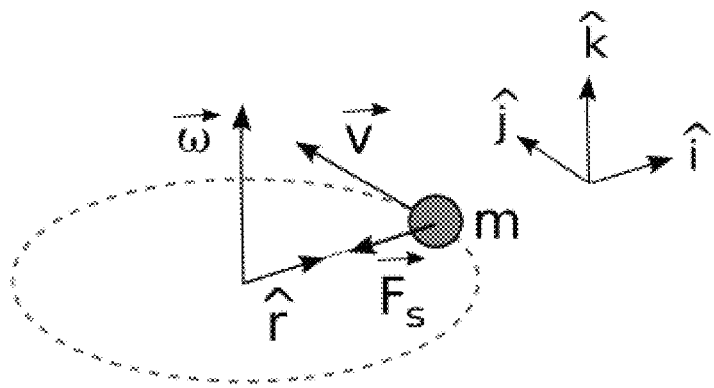

One method uses the centripetal force $F=mr\omega^2$. This is illustrated in FIG. 11b. The radial acceleration $a_y$ from an accelerometer corresponds to $r\omega^2$, so we can determine the angular velocity $\omega$ as $$\omega = \sqrt{\frac{a_y}{r}},$$

where r is the radius either determined physically or estimated. $a_y$ is greater or equal to 0 for a rotation but can become less than zero if combined with other accelerations. It will be described in the following how to isolate the rotational acceleration from $a_y$. To avoid imaginary numbers the formula could be changed to $$\omega = \sqrt{\frac{|a_y|}{r}}.$$

$\omega$ on its own does not contain information on direction of rotation. This should be derived from the below integration method.

Figure 12A:
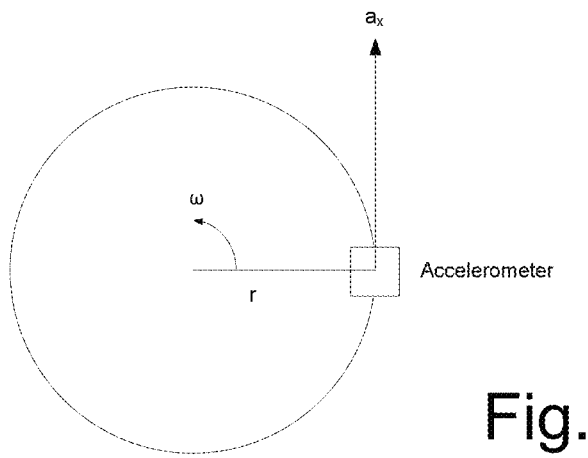
FIG. 12 a) illustrates the estimation of angular velocity of a head by an accelerometer located in a hearing aid device.
Figure 12B:
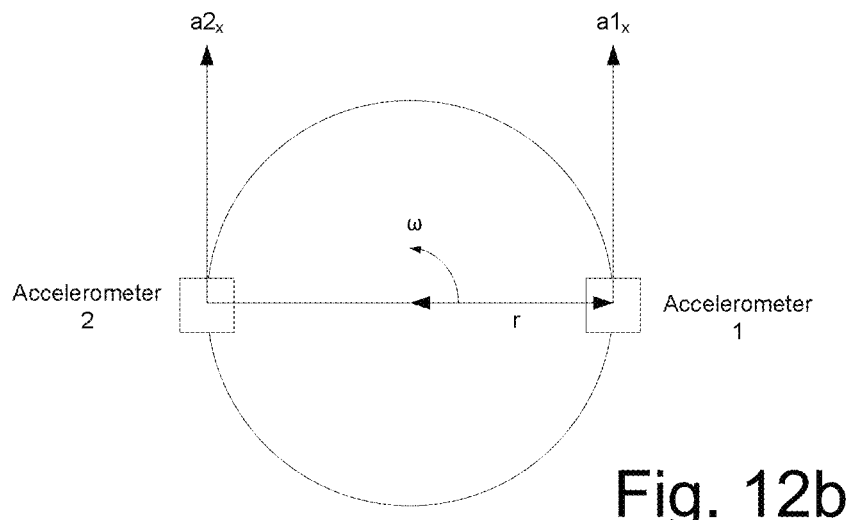

A second way of estimating the angular velocity $\omega$ is based on integration of the linear acceleration $a_x$ orthogonal to the radius of the movement as illustrated in FIG. 12a. Angular velocity is defined as $$\frac{d\omega}{dt} = \frac{a_x}{r},$$

where r is the radius either determined physically or estimated. Solving for $\omega$ gives:

$$\omega = \frac{1}{r}\int_0^t a_x(t)dt,$$

where r is the radius either determined physically or estimated. When performing a numerical integration, care must be taken to provide a high accuracy. Instead of the Euler method, Verlet or $4^{th}$ order Runge Kutta should advantageously be considered. This method for finding $\omega$ can be improved, if a pair of hearing aids is present, as the acceleration measured could contain a linear movement (like walking) so that the acceleration $a_x$ consists of $a_{lin}+a_{rot}$. To remove the linear part, we can combine the acceleration measured in the same plane on both sides of the head (see FIG. 12b). We now have: $a1_x = a_{lin} + a_{rot}$ and $a2_x = a_{lin} - a_{rot}$, if the point of rotation is centered. Subtracting the two provides: $a1_x - a2_x = (a_{lin} + a_{rot}) - (a_{lin} - a_{rot}) = 2a_{rot}$. Hence $a_{rot} = (a1_x - a2_x)/2$. The more accurate ω becomes:

$$\omega = \frac{1}{2r} \int_0^\tau (a1_x(t) - a2_x(t)) dt,$$

where r is the radius either determined physically or estimated. The centripetal method can be improved likewise.

Figure 12C:
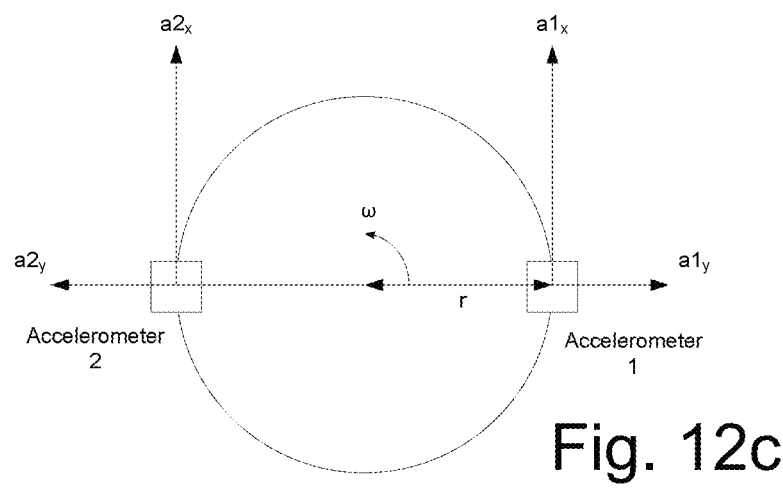

From FIG. 12c the centripetal acceleration $a_{cen}$ can be improved as: $a1_y = a_{lin} + a_{cen}$ and $a2_y = a_{cen} - a_{lin}$, if the point of rotation is centered. Adding the two provides: $a1_y + a2_y = (a_{lin} + a_{cen}) + (a_{cen} - a_{lin}) = 2a_{cen}$, and hence: $a_{cen} = (a1_y + a2_y)/2$. This also allows a better estimate of the linear acceleration:

$a1_y - a2_y = (a_{lin} + a_{cen}) - (a_{cen} - a_{lin}) = 2a_{lin}$, and thus $a_{lin} = (a1_y - a2_y)/2$ Roll is defined as a rotation around the x-axis. Roll can be determined as yaw but using acceleration in the z-plane instead of the x-plane. But additionally, the gravity method used for 'Pitch' can also be applied here.

Example 2

This example deals with achieving a higher accuracy for linear head movement estimates using two or more accelerometers. If the acceleration measured in the same geometric plane by a pair or more accelerometers are averaged, the precision increases and unwanted rotational information can be removed. The example shown in FIG. 12b becomes: $a1_x = a_{lin} + a_{rot}$ and $a2_x = a_{lin} - a_{rot}$, if the point of rotation is centered. Adding the two provides: $a1_x + a2_x = (a_{lin} + a_{rot}) + (a_{lin} - a_{rot}) = 2a_{lin}$, and hence: $a_{lin} = (a1_x + a2_x)/2$. Further, the precision is improved by 3 dB.

Example 3

This example deals with estimating the distance between the hearing aids. If at least one accelerometer and one gyroscope are present (either in one hearing aid or in a pair), it is possible to estimate the distance from the center of rotation to the sensors. The gyroscope will provide the angular velocity $\omega_g$ and the accelerometer provides $a_a = r\omega_g^2$. Solving for radius r gives:

$$r = \frac{a_a}{\omega_g^2}.$$

Assuming that the center of rotation is following a normal distribution it is possible to estimate the radius and so the distance between the hearing aids (2×radius) by averaging a large number of radius values r.

Example 4

Figure 13:
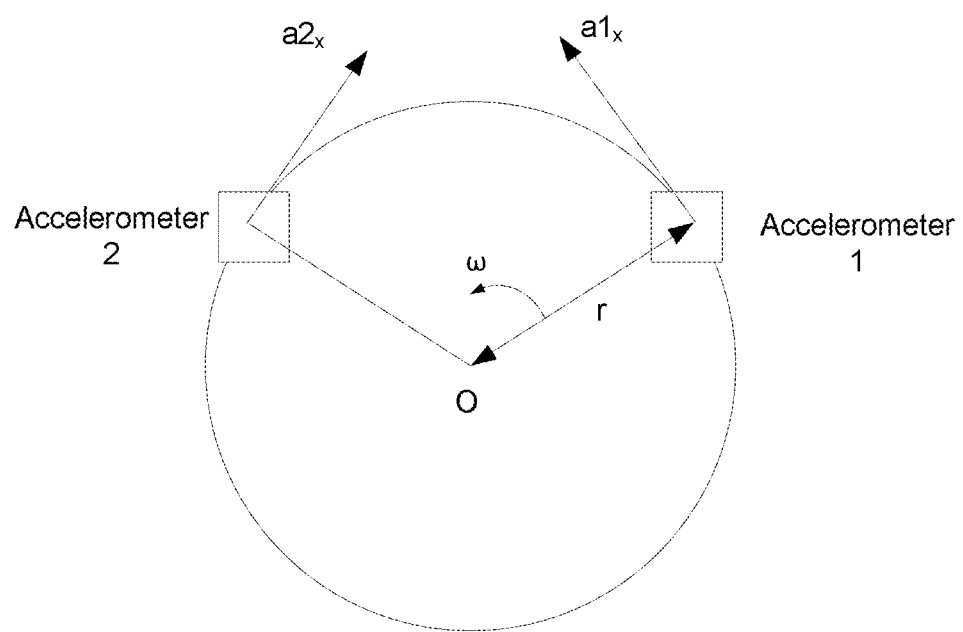
FIG. 13 illustrates a non-ideal location of the two hearing aid devices of a binaural hearing aid system, where the center of rotation of the head is NOT located on a straight line connecting the two hearing aid devices.

This example deals with overall necessary conditions when using sensors distributed in more devices as for example a pair of hearing aids where it is necessary to be able to exchange and analyze the data. The links between the devices are preferable wireless, but can also be established via wired connections. The data must be synchronized in time between the devices to ensure that the data to be analyzed are aligned in time. The analysis can take place in each device, in one device that transmits the result to the other devices, or distributed over more devices. In the above examples 1, 2 and 3, it has been assumed that the center of rotation is located on an imaginary line drawn between a pair of hearing aids. In reality we suspect that the center of rotation 'O' is placed off-line as indicated in FIG. 13. This means that the estimate of angular velocity ω is less accurate using integration of acceleration if no correction is applied. The gravity and the centripetal method are still correct even with 'O' off-line.

On/Off Detection:

Hearing aid device users often forget to turn their hearing instruments off and then the limited battery power is wasted. Especially rechargeable batteries have limited battery life. Users that have reduced dexterity and eye sight, find it difficult to turn on hearing instruments, with small buttons and battery drawers. Finally the hearing instrument can start hauling during insertion into the ear canal, if the gain is on before it is placed on/in the ear. There is thus a need for an 'intelligent' on-off mechanism for hearing aid devices.

A movement detector (e.g. an accelerometer) built into the hearing instrument is able to detect if the hearing aid device is being moved and how it is moved (fast/slow, up/down, etc.). In a simple use case, this can be used to detect that the user has taken the hearing instrument out and left it on a table and the hearing instrument can be configured to automatically turn off or be put into a 'low-power' or 'sleep mode', where the power consumption is minimal. When the user picks up the hearing instrument (e.g. the next morning), as detected by the movement sensor, it is automatically turned on, e.g. in a 'standby mode', and when it is placed into the ear, the gain is automatically turned on.

The detection using the accelerometer can be combined with a range of different detections for better and more reliable 'on-ear-detection'. Other detections could be:
Temperature detection—
Wireless range between hearing instruments.
Acoustical feedback path estimation to detect, if the hearing instrument is located in the ear (as opposed to on a table, e.g.).
Own voice detection.
Heart pulse detection All this can contribute to a longer battery life and easier operation of the hearing instrument.

Figure 14A:
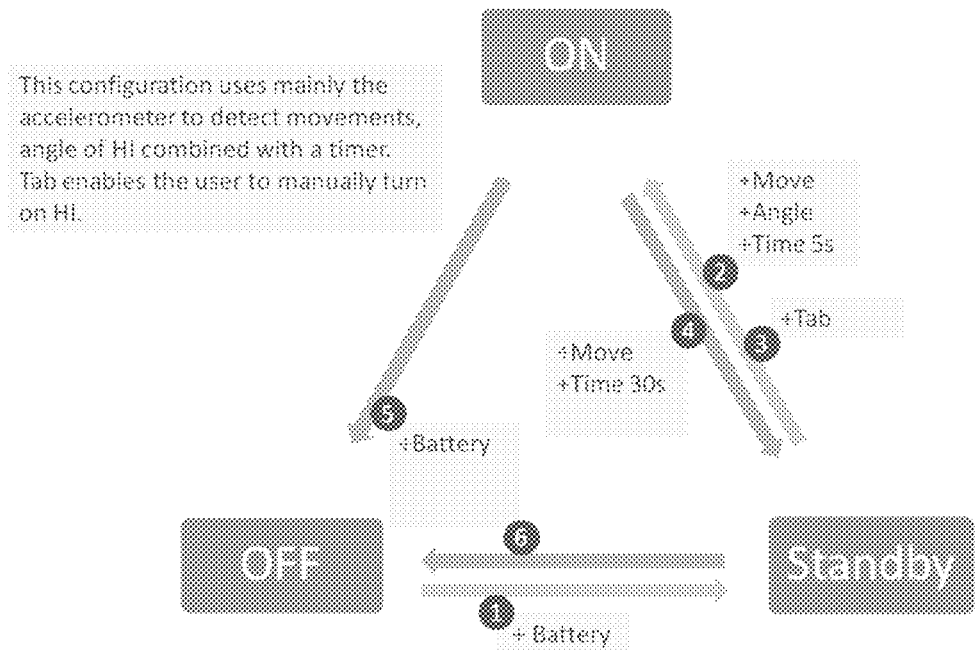
FIG. 14 a) illustrates a first embodiment of a hearing aid system (A) for automatic on/off detection.

The first suggested version of the disclosure (system A) is mainly based on the accelerometer itself, combined with a timer. See FIG. 14a and sections A1, A2, A3, A4 below.

A1. When the battery is placed in the hearing instrument, the hearing instrument is configured to start up in a standby mode where the power consumption is minimal. In a full automatic version, the accelerometer is used to detect that the hearing instrument is placed on the ear and then power up fully with full gain. The following three detections could preferably to be present:
Movement: The hearing instrument is not lying still.
Angle: The angle of the hearing instrument is close to the angle it is expected to have when operationally mounted on the ear. (This could be detected binaurally for more reliable detection)
Time: Detection of movement and angle have been present for a minimum amount of time, e.g. 5 seconds.

A2. In an alternative version where full automatic hearing instrument is not desired, the hearing instrument can be woken up by tapping the hearing instrument with the fingers. This is detected by the accelerometer of the hearing instrument, which is powered up and full gain applied.

A3. To detect that the hearing instrument is taken off and put on a table, the following detections are preferably present:
Movement: The hearing instrument is lying still.
Time: It has been lying still for a minimum amount of time, e.g. 30 sec.
A4. The battery is taken out, and the hearing instrument is completely powered off.

Figure 14B:
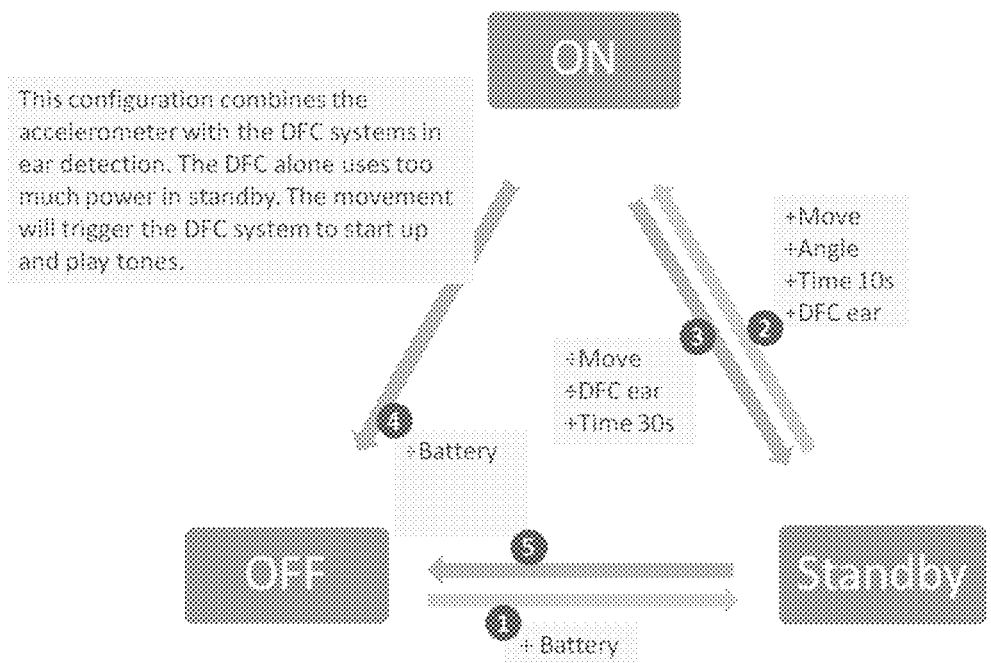

In the next suggested version of the disclosure (system B) the accelerometer detection is combined with other detections. See FIG. 14b and sections B1, B2, B3, B4 below.

B1. When the battery is placed in the hearing instrument, the hearing instrument is configured to start up in a 'standby mode', where the power consumption is minimal.

B2. In the full automatic version, the movement sensor (e.g. an accelerometer) is used to detect that the hearing instrument is placed on the ear and then configured to power up fully with full gain. The following three or four detections could preferably be present:
Movement: The hearing instrument is not lying still.
Angle: The angle of the hearing instrument is close to the angle it is expected to have when operationally mounted on the ear
Time: Detection of movement and angle has been present for a minimum amount of time, e.g. 10 seconds.
DFC (Dynamic Feedback Cancellation): If the expected detection of movement, angle and time is present, then the hearing instrument will play an acoustical signal out of the speaker, and use the DFC system (incl. a feedback path estimation system) to detect the feedback path. If the feedback path is close to the expected feedback path for the hearing instrument user, then the hearing instrument is fully powered up In case acceleration patterns from both hearing instruments are available and interchanged binaurally and correlated, it is a very strong indication that both hearing instruments are located on both ears.

B3. To detect that the hearing instrument is taken off and put on a table, the following detections are preferably present:
Movement: The hearing instrument is lying still.
DFC: DFC has detected that the hearing instrument is out of the ear (e.g. by howling/larger than normal feedback path estimate).
Time: The movement and DFC detections have been present for a minimum amount of time, e.g. 30 sec.
B4. The battery is taken out, and the hearing instrument is completely powered off.

Additional details of the on-/off-detection (and switching) using movement sensor(s):
The accelerometers can work independently from the general signal processing unit (DSP) of the hearing aid device, and be used to control a switch to power up the DSP, for further signal processing, e.g. necessary for determining a microphone direction (angle of inclination) of the haring instrument, the feedback path estimate (DFC), etc.
The accelerometer can have a built-in temperature sensor, a 'tapping detector' and 'lying flat detector' (the latter two detectors being e.g. implemented using an accelerometer).
The power consumption of the movement sensor (e.g. accelerometer) can be as low as in the range from 1 μA to 130 μA. The hearing instrument can be running in a suspend mode where the total current consumption can be lowered to around 600 μA, which is around half the current consumption from a normal power on mode.

For a standard hearing aid with a 175 mAh, 1.2 V battery with 16 hours of daily use, the battery life would be extended for at least one more day compared to if the hearing aid is on 24 hours a day.
In a design with rechargeable batteries where the battery does not need to be replaced by the end user, it is possible to make a design with no buttons for easier use, and a sealed housing for better reliability.
The in-ear detection can also be detected (alone or in combination with other detections), by detecting the users pulse, by measuring the change in acceleration caused by the heart rate pulse.
The in-ear detection can also be combined with the own voice detection for a more reliable detection.

LIST OF REFERENCE NUMERALS 2, 2'—Hearing aid device
4, 4'—Hearing aid user
5, 5', 5", 5'"—Individual
6—Ear
8—Sensor member
10—Ear mould
12—Tube
14—Time
16—Level of physical activity
18—Histogram
20—Hearing aid settings
22—Level of physical activity
24, 26, 28, 30—Parameter
32—Loudspeaker
34—Sound
35—Signal
36—Mouth
38, 38'—Microphone
40—Mobile phone
42, 44—Component
46—Actuator
48, 48'—Coil
g—Gravity
$d_1$, $d'_1$, $d_2$, $d'_2$—Distance
$\alpha$, $\phi$—Angle
acc—Acceleration
H—Horizontal
$H_s$—Line
I—First position
II—Second position
III—First position
IV—Second position
$P_1$, $P_2$—Setting

The invention claimed is:

1. A hearing aid device for improving, augmenting and/or protecting the hearing capability of a user when receiving acoustic signals from the surroundings of the user, the hearing aid device comprising an input unit for generating corresponding audio signals, a signal processing unit for modifying the audio signals and an output unit for providing modified audio signals as audible signals to at least one of the user's ears, the hearing aid device comprising a sensor member for detecting the movement and/or acceleration an/or orientation and/or position of the hearing aid device, the input unit of the hearing aid device comprises at least two hearing aid microphones and a control unit for determining the position or a deviation from an intended position of the hearing aid device or hearing aid microphones and wherein the hearing aid device is configured to compensate for a possible dislocation of the hearing aid microphones.

2. A hearing aid device according to claim 1 comprising a directional system with an adaptive directional algorithm for providing a combined signal based on signals from the at least two hearing aid microphones.

3. A hearing aid device according to claim 2, wherein the control unit is configured for changing an adaptation speed in one or more adaptive algorithms applied to the audio signal by the hearing aid device.

4. A hearing aid device according to claim 1 comprising a feedback estimation unit comprising an adaptive feedback algorithm for estimating a feedback path from the output unit to the input unit.

5. A hearing aid device according to claim 4 comprising a memory wherein a reference position or an orientation of the hearing aid device is stored.

6. A hearing aid device according to claim 5 configured to compare a current position of the hearing aid with the stored reference position and to determine a modified reference feedback path estimate used for determining a current setting of signal processing parameters used in the signal processing unit for modifying the audio signals.

7. A hearing aid device according to claim 6 configured to determine said modified reference feedback path estimate used for determining the current setting of signal processing parameters based on an algorithm or a lookup table with corresponding values of incremental position changes and feedback path and/or processing parameter values.

8. A hearing aid device according to claim 6 configured to determine a modified reference feedback path estimate in connection with power up of the hearing device and/or after a mounting of the hearing aid device at an ear of the user.

9. A hearing aid device according to claim 6 configured to continuously monitor a plurality of microphone positions and to modify the reference feedback path estimate and/or the setting of signal processing parameters.

10. A hearing aid device according to claim 6 wherein the setting of signal processing parameters comprises frequency dependent maximum gain values that may be applied to the audio signals to minimize the risk of feedback.

11. A hearing aid device according to claim 1, wherein the hearing aid device is configured for detecting if the hearing aid user is moving or turning the head and for improving and/or augmenting received acoustic signals from the surroundings of the hearing aid user by compensating for the head movement if it is detected that the hearing aid user is moving or turning the head.

12. A hearing aid device according to claim 1, comprising an actuator configured to change the orientation of the hearing aid microphones.

13. A hearing aid device according to claim 1 configured to use the sensor member together with other sensors to detect whether or not the hearing aid device is located at or on one of the ears of a user.

14. A hearing aid device according to claim 1 wherein control of functionality of the hearing aid device is performed by said sensor member in combination with a number of other sensors including one or more of a time unit for estimating a time range elapsed and a feedback path unit for estimating a feedback path of the hearing aid device.

15. A hearing aid device according to claim 1 configured to use the difference in input level between the two hearing aid microphones to detect whether the user's own voice is present in the current acoustic signals received by the microphones and to provide an own voice control signal indicative thereof.

16. A hearing aid device according to claim 15 configured to estimate a reliability of the own voice control signal based on a comparison of a current position of the hearing aid with a stored reference position.

17. A hearing aid system comprising two hearing aid devices according to claim 1 each comprising antenna and transceiver circuitry for establishing a communication link to the other hearing device, and thereby allowing the exchange of information between them.

18. A hearing aid system according to claim 17 wherein at least one of the hearing aid devices is configured for determining the angle ($\alpha$) between the hearing aid devices on the basis of measurements made by means of the sensor member(s) in the two hearing devices.

19. A hearing aid system according to claim 17 further comprising an auxiliary device, and wherein the hearing aid system is configured to allow the hearing aid devices and the auxiliary device to communicate with each other.

20. A hearing aid system according to claim 17 wherein an estimated reliability of the own voice control signal is based on the comparison of a current position of the hearing aid with a stored reference position of both hearing aid devices of the hearing aid system.

* * * * *